（12）United States Patent
Hong et al.

(10) Patent No.: US 9,979,872 B2
(45) Date of Patent: May 22, 2018

(54) PHOTOGRAPHING APPARATUS AND METHOD OF CONTROLLING THE SAME

(71) Applicant: SAMSUNG ELECTRONICS CO., LTD., Suwon-si, Gyeonggi-do (KR)

(72) Inventors: Hyun-seok Hong, Suwon-si (KR); Sahng-gyu Park, Seongnam-si (KR); Yeong-rok Lee, Suwon-si (KR); Jin-gu Jeong, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days. days.

(21) Appl. No.: 15/165,243

(22) Filed: May 26, 2016

(65) Prior Publication Data

US 2017/0026564 A1 Jan. 26, 2017

(30) Foreign Application Priority Data

Jul. 24, 2015 (KR) ........................ 10-2015-0105300

(51) Int. Cl.
*H04N 5/262* (2006.01)
*H04N 5/222* (2006.01)
(Continued)

(52) U.S. Cl.
CPC ........... *H04N 5/23206* (2013.01); *G06T 7/73* (2017.01); *H04N 5/23222* (2013.01);
(Continued)

(58) Field of Classification Search
CPC ........... H04N 5/23206; H04N 5/23222; H04N 5/23293; H04N 5/3532; G06T 2207/10016
See application file for complete search history.

(56) References Cited

U.S. PATENT DOCUMENTS

2011/0299729 A1* 12/2011 Dawe ................. A63B 24/0003
  382/103
2013/0116808 A1*  5/2013 Molinari ................ A63B 69/36
  700/91
(Continued)

FOREIGN PATENT DOCUMENTS

JP   2008-104509    5/2008
JP   2013-118876    6/2013
(Continued)

*Primary Examiner* — Lin Ye
*Assistant Examiner* — John H Morehead, III
(74) *Attorney, Agent, or Firm* — Nixon & Vanderhye P.C.

(57) ABSTRACT

A photographing apparatus for photographing a scene happening in a very short moment, such as an impact moment, in a high speed movement, such as a golf swing movement, a baseball swing movement, etc., and a method of controlling the photographing apparatus are provided. The method of controlling the photographing apparatus includes: receiving an input with respect to a region of interest during the swing movement; receiving a portion of the swing movement, which is input on an area of a screen, in a state in which a live view image is displayed on the screen; determining a rotational angle of a swing object based on the received portion of the swing movement; and determining a point in time of photographing with respect to the region of interest, based on the determined rotational angle, and photographing a subject at the determined point in time of photographing.

19 Claims, 20 Drawing Sheets

(51) Int. Cl.
*H04N 5/232* (2006.01)
*H04N 5/353* (2011.01)
*G06T 7/73* (2017.01)

(52) U.S. Cl.
CPC ....... *H04N 5/23293* (2013.01); *H04N 5/3532* (2013.01); *G06T 2207/10016* (2013.01); *G06T 2207/30221* (2013.01)

(56) References Cited

U.S. PATENT DOCUMENTS

| | | | | |
|---|---|---|---|---|
| 2013/0143682 | A1* | 6/2013 | Ueda | A63B 69/36 473/219 |
| 2013/0250118 | A1* | 9/2013 | Kawakami | H04N 7/183 348/157 |
| 2014/0047457 | A1* | 2/2014 | Nojima | G09B 19/0038 719/313 |
| 2014/0285718 | A1* | 9/2014 | Murakami | H04N 5/91 348/571 |
| 2015/0085149 | A1* | 3/2015 | Tsubaki | H04N 5/23277 348/208.4 |
| 2015/0111657 | A1* | 4/2015 | Shibuya | G06K 9/00342 473/223 |
| 2015/0285834 | A1* | 10/2015 | Shibuya | G01P 15/0802 702/150 |
| 2015/0348591 | A1* | 12/2015 | Kaps | G11B 27/17 386/201 |
| 2017/0007902 | A1* | 1/2017 | Cottam | G06F 19/3481 |

FOREIGN PATENT DOCUMENTS

| | | |
|---|---|---|
| KR | 1998-0026347 | 7/1998 |
| KR | 10-0620873 | 8/2006 |
| KR | 10-2007-0026282 | 3/2007 |
| KR | 10-1044887 | 6/2011 |
| KR | 10-2011-0122656 | 11/2011 |
| KR | 10-1358859 | 2/2014 |
| WO | WO 2006/135160 | 12/2006 |

\* cited by examiner

1310

PHOTOGRAPHING APPARATUS AND METHOD OF CONTROLLING THE SAME

CROSS-REFERENCE TO RELATED APPLICATION

This application is based on and claims priority under 35 U.S.C. § 119 to Korean Patent Application No. 10-2015-0105300, filed on Jul. 24, 2015, in the Korean Intellectual Property Office, the disclosure of which is incorporated by reference herein in its entirety.

BACKGROUND

1. Field

The present disclosure relates to a photographing apparatus and a method of controlling the same.

2. Description of Related Art

There have been constant demands for photographing swing movements in order to correct swing positions, analyze swing orbits, etc.

However, according to previous photographing of swing movements, after a human eye detects a predetermined moment, a time to press a shutter was taken, and a memory capacity was insufficient for continuation of high speed and high resolution photographing.

SUMMARY

A photographing apparatus for photographing a scene happening in a very short moment, such as an impact moment, in a high speed movement, such as a golf swing movement, a baseball swing movement, etc., and a method of controlling the photographing apparatus are provided.

Additional aspects will be set forth in part in the description which follows and, in part, will be apparent from the description.

According to an aspect of an example embodiment, a method of controlling a photographing apparatus photographing a swing movement includes: receiving an input with respect to a region of interest in the swing movement; receiving a portion of the swing movement input on an area of a screen, when a live view image is displayed on the screen; determining a rotational angle of a swing object based on the received portion of the swing movement; and determining a point in time of photographing the region of interest, based on the determined rotational angle, and photographing a subject at the determined point in time of photographing.

The determining of the rotational angle of the swing object may include generating a swing orbit based on the received portion of the swing movement, and correcting one or more of distortion of the swing orbit due to an angle between a reference plane of the swing movement and the swing object and due to an angle between the photographing apparatus and the subject.

The correcting may include determining one or more of the angle between the reference plane and the swing object and the angle between the photographing apparatus and the subject, using at least one of a predetermined equation and data obtained by learning.

The receiving of the input with respect to the region of interest may include automatically receiving an input with respect to a predetermined region or manually receiving the input.

The determining of the rotational angle of the swing object may include when an image sensor obtaining an image operates as a rolling shutter, correcting a reading angle error with respect to an object moving in a horizontal direction of the image sensor.

The point in time of photographing may be determined by determining a gap between a point in time in which a photographing instruction is received and a point in time in which the photographing is performed.

The photographing the subject may include photographing all or part of the region of interest as at least one of a still image and a video.

The photographing the subject may include photographing all or part of the region of interest by changing frames per second (FPS) or resolution.

The method may further include storing the generated swing orbit as metadata, and when displaying the photographed image, displaying the swing orbit stored as metadata together with the photographed image.

According to an aspect of another example embodiment, a photographing apparatus photographing a swing movement includes: an input device configured to receive an input with respect to a region of interest in the swing movement; a display configured to display a live view image; and a processor configured to control the photographing apparatus to determine a rotational angle of a swing object based on a portion of the swing movement displayed on the display, to determine a point in time of photographing the region of interest based on the determined rotational angle, and to photograph a subject at the determined point in time of photographing.

The processor may generate a swing orbit based on the displayed portion of the swing movement, and correct one or more of distortion of the swing orbit due to an angle between a reference plane of the swing movement and the swing object and due to an angle between the photographing apparatus and the subject.

The processor may determine at least one of the angle between the reference plane and the swing object and the angle between the photographing apparatus and the subject, using at least one of a predetermined equation and data obtained by learning, and correct the at least one of the distortion due to the angle between the reference plane and the swing object and the distortion due to the angle between the photographing apparatus and the subject.

The input device may automatically receive an input with respect to a predetermined area or manually receives the input.

When an image sensor obtaining an image operates as a rolling shutter, the processor may correct a swing orbit by correcting a reading angle error with respect to an object moving in a horizontal direction of the image sensor.

The processor may determine the point in time of photographing by determining a gap between a point in time in which a photographing instruction is received and a point in time in which the photographing is performed.

The processor may photograph all or part of the region of interest as at least one of a still image and a video.

The processor may control the photographing apparatus to photograph all or part of the region of interest by changing frames per second (FPS) or resolution.

The apparatus may store the generated swing orbit as metadata, and when displaying the photographed image, display the swing orbit stored as metadata together with the photographed image.

According to an aspect of another example embodiment, a non-transitory computer-readable recording medium having embodied thereon a computer program for executing a method of controlling a photographing apparatus photographing a swing movement is provided, the method including: receiving an input with respect to a region of interest in the swing movement; receiving a portion of the swing movement input on an area of a screen, when a live view image is displayed on the screen; determining a rotational angle of a swing object based on the received portion of the swing movement; and determining a point in time of photographing the region of interest, based on the determined rotational angle, and photographing a subject at the determined point in time of photographing.

BRIEF DESCRIPTION OF THE DRAWINGS

These and/or other aspects will become apparent and more readily appreciated from the following detailed description, taken in conjunction with the accompanying drawings, in which like reference numerals refer to like elements, and wherein.

DETAILED DESCRIPTION

Figure 1:
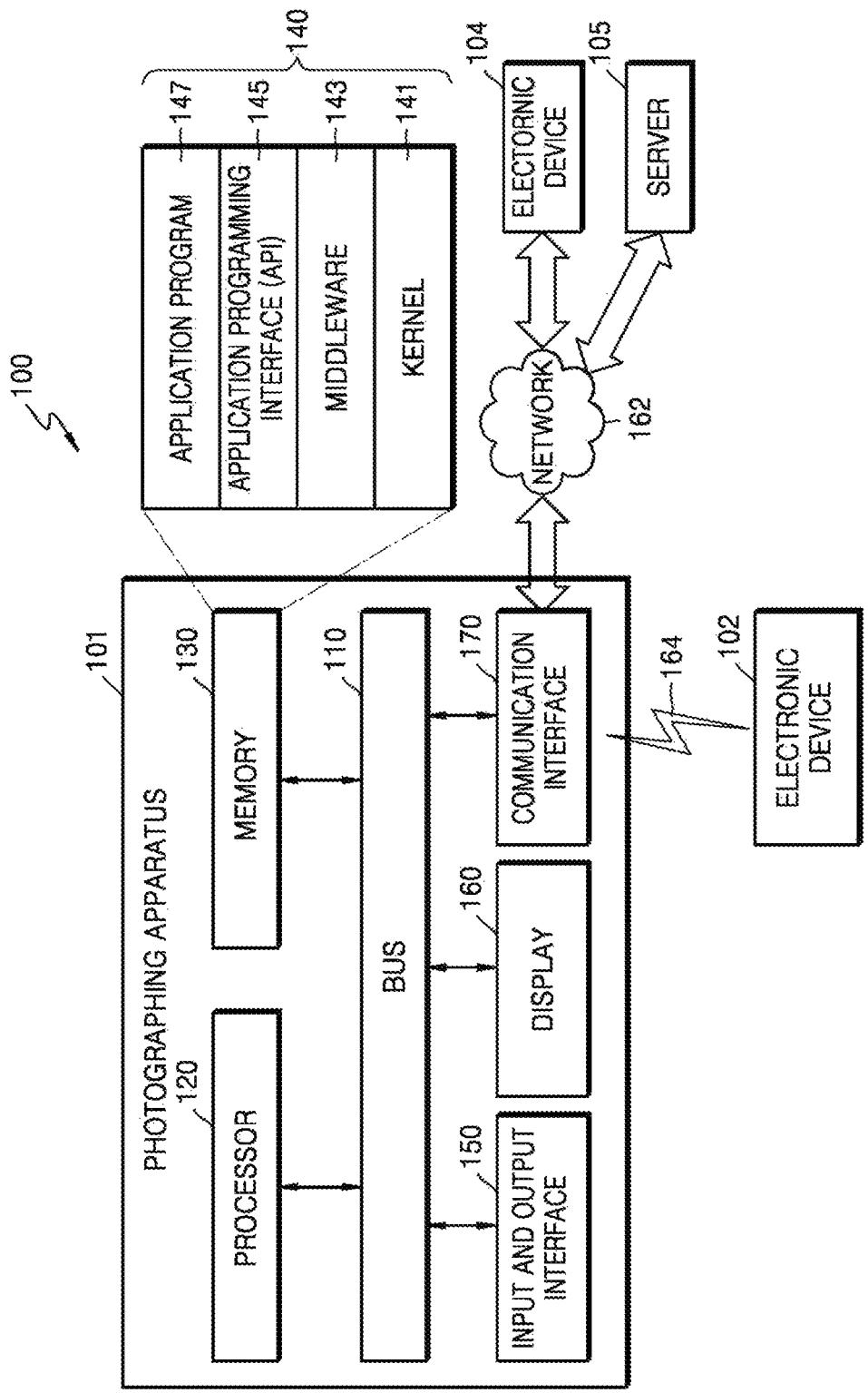
FIG. 1 is a schematic block diagram of a photographing apparatus in a network environment according to various embodiments.

The example embodiments will now be described more fully with reference to the accompanying drawings, in which exemplary embodiments of the disclosure are shown. It should be understood, however, that there is no intent to limit exemplary embodiments of the disclosure to the particular forms disclosed, but conversely, exemplary embodiments of the disclosure are to cover all modifications, equivalents, and alternatives falling within the spirit and scope of the disclosure. Like reference numerals denote like elements in the drawings. In the attached drawings, sizes of structures may be exaggerated for clarity. As used herein, the term "and/or" includes any and all combinations of one or more of the associated listed items. Expressions such as "at least one of," when preceding a list of elements, modify the entire list of elements and do not modify the individual elements of the list.

Most of the terms used herein are general terms that have been widely used in the technical art to which the present disclosure pertains. However, some of the terms used herein may be created reflecting intentions of technicians in this art, precedents, or new technologies. Also, some of the terms used herein may be arbitrarily chosen by the present applicant. In this case, these terms are defined in detail below. Accordingly, the specific terms used herein should be understood based on the unique meanings thereof and the whole context of the present disclosure.

The term "unit" in the embodiments of the present disclosure may, for example, refer to a software component or hardware components such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units," or may be divided into additional components and "units."

In this description, a mobile device denotes a relatively small portable computer device. For example, the mobile device may include a cellular phone, a personal digital assistant (PDA), a notebook computer, etc.

It will be further understood that when a part "includes" or "comprises" an element, unless otherwise defined, the part may further include other elements, not excluding the other elements.

In this description, an expression such as "A or B," "at least one of A and/or B," or "one or more of A and/or B" may include every possible combination of the listed items. For example, "A or B," "at least one of A and B," or "at least one of A or B" may indicate all the cases of 1) including at least one A, 2) including at least one B, and 3) including at least one A and at least one B.

It will be understood that, although the terms first, second, etc. may be used herein to describe various elements, irrespective of an order and/or importance, these elements should not be limited by these terms. These terms are only used to distinguish one element from another. For example, a first user device and a second user device may indicate different user devices, irrespective of an order or importance. For example, a first element could be termed a second element, and, similarly, a second element could be termed a first element, without departing from the scope of exemplary embodiments.

When it is described that an element (for example, a first element) is "(operatively or communicatively) coupled with/to" or "connected to" another element (for example, a second element), it should be understood that the element may be directly connected to the other element or may be connected to the other element via another element (for example, a third element). On the contrary, when it is described that an element (for example, a first element) is "directly connected to" or the element "directly contacts" another element (for example, a second element), it would be understood that there exists no other element (for example, a third element) between the first element and the second element.

Upon circumstances, the expression used in this specification, "configured to" may be interchangeably used with an expression, such as "suitable for," "having the capacity to," "designed to," "adapted to," "made to," or "capable of." The expression "configured to" may not necessarily denote only "specifically designed to" in a hardware method. Rather, in some contexts, a device "configured to" may denote a device "capable of" when the device is used with other devices and components. For example, "a processor configured to perform A, B, and C" may denote an exclusive processor (for example, an embedded processor) for performing the corresponding operations, or a generic-purpose processor (for example, a central processing unit (CPU), or an application processor), which may perform the corresponding operations by executing one or more software programs stored in a memory device.

In this specification, a swing orbit may denote a sequential value of information associated with a coordinate or an angle of a swing object, according to the passage of time.

The terminology used herein is for the purpose of describing particular embodiments only and is not intended to be limiting of exemplary embodiments. As used herein, the singular forms "a," "an" and "the" are intended to include the plural forms as well, unless the context clearly indicates otherwise. All terms including technical and scientific terms used herein have meanings which can be generally understood by those of ordinary skill in the art, if the terms are not particularly defined. General terms defined by dictionaries should be understood to have meanings which can be contextually understood in the art and should not have ideally or excessively formal meanings, if the terms are not defined particularly herein by the present disclosure. Even if the terms are defined in this specification, the terms should not be interpreted to exclude embodiments of this specification.

Photographing apparatuses according to one or more of the embodiments of the specification may include, for example, at least one of smartphones, tablet personal computers (PCs), mobile phones, video phones, e-book readers, desktop PCs, laptop computers, netbook computers, workstations, servers, PDAs, portable multimedia players (PMPs), MP3 players, mobile medical devices, cameras, and wearable devices. According to various embodiments, the wearable devices may include at least one of accessory types (for example, a watch, a ring, a bracelet, an ankle bracelet, a necklace, glasses, contact lenses, or a head-mounted-device (HMD), integral fabric or clothing types (for example, electronic clothing), body-attachable types (for example, skin pads or tattoos), and implantable circuits.

In some embodiments, the photographing apparatus may include a home appliance. The home appliance may include, for example, at least one of televisions, digital video disk (DVD) players, audios, refrigerators, air conditioners, vacuum cleaners, ovens, microwave ovens, laundry machines, air cleaners, set-top boxes, home automation control panels, security control panels, TV boxes (for example, Samsung HomeSync™, AppleTV™, or GoogleTV™), game consoles (for example, Xbox™ or PlayStation™), electronic dictionaries, electronic keys, camcorders, and electronic frames.

In other embodiments, the photographing apparatus may include at least one of various medical devices (for example, various portable medical measurement devices (such as a blood sugar measuring device, a heartbeat measuring device, a blood pressure measuring device, a body temperature measuring device, or the like), magnetic resonance angiography (MRA), magnetic resonance imaging (MRI), computed tomography (CT) imaging device, an ultrasound device, or the like), navigation devices, global navigation satellite system (GNSS), event data recorder (EDR), flight data recorder (FDR), automobile infotainment device, electronic equipment for ships (for example, a navigation device for ships, a gyro compass, etc.), avionics electronic devices, security devices, automobile head units, industrial or home robots, automatic teller's machines (ATMs), point of sales (POSs), and internet of things (for example, light bulbs, various sensors, electricity or gas meter machines, sprinklers, fire alarm devices, thermostats, streetlights, toasters, exercise machines, hot water tanks, heaters, boilers, etc.).

In some embodiments, the photographing apparatus may include at least one of some of furniture or buildings/structures, electronic boards, electronic signature receiving devices, projectors, and various measuring devices (for example, waterworks, electricity, gas, radio wave measuring devices, etc.). According to various embodiments, the photographing apparatus may include one or a combination of one or more of the enlisted devices. According to an embodiment, the photographing apparatus may be a flexible electronic device. Also, the photographing apparatus according to embodiments of the present disclosure is not limited to the devices described above, and may include new electronic devices that will be developed according to the development of technologies.

Hereinafter, photographing apparatuses according to various embodiments will be described by referring to the accompanying drawings. In this specification, the term "user" may refer to a user of a photographing apparatus or a device (an artificial intelligence electronic device) using the photographing apparatus.

FIG. 1 is a schematic block diagram of a photographing apparatus 101 in a network environment, according to various embodiments. The photographing apparatus 101 may include a bus 110, a processor 120, a memory 130, an input and output interface 150, a display 160, and a communication interface 170. In some embodiments, the photographing apparatus 101 may omit at least one of the components or additionally include other components.

The bus 110 may, for example, include a circuit for connecting the components 110 through 170 with one another and transmitting communication (for example, a control message and/or data) among the components 110 through 170.

The processor 120 may include at least one of a central processing unit (CPU), an application processor (AP), and a communication processor (CP). The processor 120 may, for example, control at least another component of the photographing apparatus 101 and/or perform computation or data processing associated with communication.

The memory 130 may include a volatile and/or a non-volatile memory. The memory 130 may, for example, store instructions or data related to at least another component of the photographing apparatus 101. According to an embodiment, the memory 130 may store software and/or a program 140.

The program 140 may include, for example, a kernel 141, middleware 143, an application programming interface (API) 145, and/or an application program (or an application) 147. At least some of the kernel 141, the middleware 143, and the API 145 may be referred to as an operating system (OS).

The input and output interface 150 may, for example, function as an interface which may transmit instructions or data input from a user or other external devices to another (other) component(s) of the photographing apparatus 101. Also, the input and output interface 150 may output the instructions or data received from the other (other) component(s) of the photographing apparatus 101 to the user or other external devices.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may display, for example, various pieces of content (for example, a text, an image, a video, an icon, a symbol, or the like) to the user. The display 160 may include a touch screen, and may receive a touch input, a gesture input, a proximate input, or a hovering input using an electronic pen or a part of a human body of the user.

The communication interface 170 may, for example, set communication between the photographing apparatus 101 and an external device (for example, a first external electronic device 102, a second external electronic device 104, or a server 106). For example, the communication interface 170 may be connected to a network 162 via wireless communication or wired communication and may communicate with the external device (for example, the second external electronic device 104 or the server 106).

The wireless communication is for example a cellular communication protocol, and may implement, for example, at least one of long-term evolution (LTE), LTE advance (LTE-A), code division multiple access (CDMA), wideband CDMA (WCDMA), universal mobile telecommunications system (UMTS), wireless broadband (WiBro), and global system for mobile communications (GSM). Also, the wireless communication may include, for example, short range communication 164. The short range communication 164 may include, for example, at least one of wireless fidelity (Wifi), Bluetooth, near field communication (NFC), and global navigation satellite system (GNSS). The GNSS may include, for example, at least one of global positioning system (GPS), global navigation satellite system (Glonass), Beidou navigation satellite system (hereinafter, Beidou), and Galileo, the European global satellite-based navigation system, according to a use region or a bandwidth. Hereinafter, the "GPS" may be interchangeably used with the "GNSS." The wired communication may include, for example, at least one of universal serial bus (USB), high definition multimedia interface (HDMI), recommended standard 232 (RS-232), and plain old telephone service (POTS). The network 162 may include a telecommunications network. The telecommunications network may include, for example, at least one of a computer network (for example, LAN or WAN), an internet, and a telephone network.

Each of the first and second external electronic devices 102 and 104 may be the same type device as the photographing apparatus 101 or a different type device from the photographing apparatus 101. According to an embodiment, the server 106 may include at least one server or a group of one or more servers. According to various embodiments, all or part of operations performed by the photographing apparatus 101 may be performed by one or more electronic devices (for example, the electronic devices 102 and 104) or the server 106. According to an embodiment, when the photographing apparatus 101 is to perform a certain function or service automatically or upon request, the photographing apparatus 101 may request another device (for example, the electronic device 102 or 104, or the server 106) to perform at least a portion of the function or service, rather than performing the function or service by itself. Alternatively, the photographing apparatus 101 may additionally request the other device (i.e., the electronic device 102 or 104) to perform at least a portion of the function or service. The other device (i.e., the electronic device 102 or 104, or the server 106) may perform the requested function or the additional function, and may transmit a result thereof to the photographing apparatus 101. The photographing apparatus 101 may provide the requested function or service by providing the received result itself or by additionally processing the result. To this end, for example, a cloud computing, distribution computing, or client-server computing technology may be used.

Figure 2:
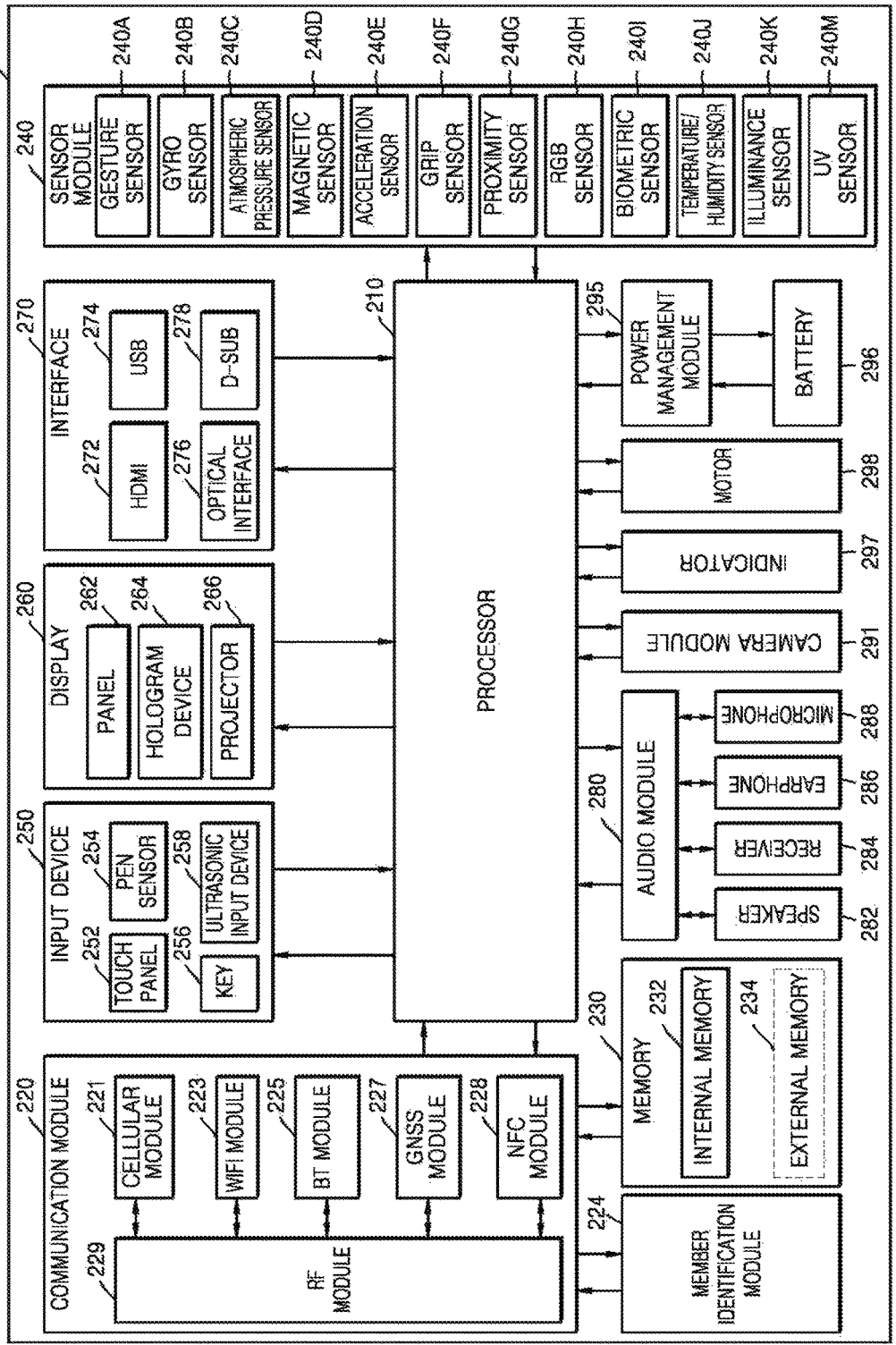
FIG. 2 is a schematic block diagram of a photographing apparatus according to various embodiments.

FIG. 2 is a block diagram of a photographing apparatus 201 according to various embodiments. The photographing apparatus 201 may include, for example, the whole or part of the photographing apparatus 101 illustrated in FIG. 1. The photographing apparatus 201 may include one or more processors (for example, an AP 210), a communication module 220, a member identification module 224, a memory 230, a sensor module 240, an input device (e.g., including input circuitry) 250, a display 260, an interface 270, an audio module 280, a camera module 291, a power management module 295, a battery 296, an indicator 297, and a motor 298.

For example, the processor 210 may drive an OS or an application program to control multiple hardware or software components connected to the processor 210, and may perform various types of data processing and computation. For example, the processor 210 may be realized as a system on chip (SoC). According to an embodiment, the processor 210 may further include a graphic processing unit (GPU) and/or an image signal processor. Also, the processor 210 may include at least one (for example, a cellular module 221) of the components illustrated in FIG. 2. The processor 210 may load a command or data received from at least one of the other components (for example, a nonvolatile memory) to a volatile memory and process the command or data, and may store various data to the nonvolatile memory.

The communication module 220 may have the same or substantially the same structure as the communication interface 170 of FIG. 1. The communication module 220 may include, for example, the cellular module 221, a Wifi module 223, a Bluetooth module 225, a GNSS module 227 (for example, a GPS module, a Glonass module, a Beidou module, or a Galileo module), an NFC module 228, or a radio frequency (RF) module 229.

The memory 230 (for example, the memory 130) may include, for example, an internal memory 232 or an external memory 234. The internal memory 232 may include, for example, at least one of a volatile memory (for example, dynamic random access memory (DRAM), static RAM (SRAM), synchronous DRAM (SDRAM), etc.), and a non-volatile memory (for example, one time programmable read only memory (OTPROM), programmable ROM (PROM), erasable and programmable ROM (EPROM), electrically erasable and programmable ROM (EEPROM), mask ROM, flash ROM, a flash memory (for example, NAND flash, NOR flash, etc.), a hard drive, a solid state drive (SSD), etc.).

The external memory 234 may further include a flash drive, for example, compact flash (CF), secure digital (SD), micro-SD, mini-SD, extreme digital (xD), multimedia card (MMC), a memory stick, or the like. The external memory 234 may be operationally and/or physically connected with the photographing apparatus 201 via various interfaces.

The sensor module 240 may, for example, measure a physical quantity or sense an operation state of the photographing apparatus 201 and convert the measured or sensed information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximate sensor 240G, a color sensor 240H (for example, a red, green, blue (RGB) sensor), a biometric sensor 240I, a temperature/humidity sensor 240J, an illuminance sensor 240K, and an ultraviolet sensor 240M. The sensor module 240 may further include a control circuit for controlling the at least one sensor included in the sensor module 240. In some embodiments, the photographing apparatus 201 may further include a processor configured to control the sensor module 240, as part of the processor 210, or in addition to the processor 210, so that the photographing apparatus 201 may control the sensor module 240 when the processor 210 is in a sleep state.

The input device 250 may include various input circuitry, for example, a touch panel 252, a (digital) pen sensor 254, a key 256, or an ultrasonic input device 258. The touch panel 252 may implement, for example, at least one of an electrostatic method, a decompression method, an infrared method, and an ultrasonic method. Also, the touch panel 242 may further include a control circuit. The touch panel 252 may further include a tactile layer to provide a haptic reaction to a user.

The (digital) pen sensor 254 may include, for example, a sheet for recognition, as part of the touch panel 252 or as an additional component. The key 256 may include, for example, a physical button, an optical key, or a keypad. The ultrasonic input device 258 may sense ultrasonic waves generated from an input device via a microphone (for example, a microphone 288), and identify data corresponding to the sensed ultrasonic waves.

The display 260 (for example, the display 160) may include a panel 262, a hologram device 264, or a projector 266. The panel 262 may have the same or substantially the same structure as the display 160 of FIG. 1. The panel 262 may be realized, for example, as flexible, transparent, or wearable. The panel 262 and the touch panel 252 may be formed as an integral module.

The interface 270 may include, for example, a high-definition multimedia interface (HDMI) 272, universal serial bus (USB) 274, an optical interface 276, or D-subminiature (D-sub) 278.

The audio module 280 may, for example, convert a sound and an electrical signal bilaterally. For example, at least some components of the audio module 280 may be included in the input and output interface 145 illustrated in FIG. 1. The audio module 280 may process sound information that is input or output via, for example, a speaker 282, a receiver 284, an earphone 286, the microphone 288, or the like.

The camera module 291 is for example a device for photographing a still image and a video. According to an embodiment, the camera module 291 may include one or more image sensors (for example, a front sensor or a rear sensor), a lens, an image signal processor (ISP), or a flash (for example, an LED or a xenon lamp, etc.).

The power management module 295 may, for example, manage power of the photographing apparatus 201. According to an embodiment, the power management module 295 may include a power management integrated circuit (PMIC), a charger integrated circuit (IC), or a battery or a fuel gauge. The PMIC may have a wired and/or a wireless charge method. The battery gauge may measure, for example, a remaining amount of the battery 296, and a voltage, a current, or a temperature of the battery 296 during charging.

The indicator 297 may indicate a specific state of the photographing apparatus 201 or a component thereof (for example, the processor 210), such as a booting state, a message state, or a charge state. The motor 298 may convert an electrical signal into mechanical vibration, and may generate vibration or haptic effects.

Each of the components described in this specification may be formed of one or more components, and a name of the each of the components may vary according to a type of the electronic device. According to various embodiments, the electronic device may include at least one of the components described in this specification, and may omit some of the components or further include additional components. Also, some of the components of the electronic device may be combined as one entity to perform the same functions as the components before they were combined.

Figure 3:
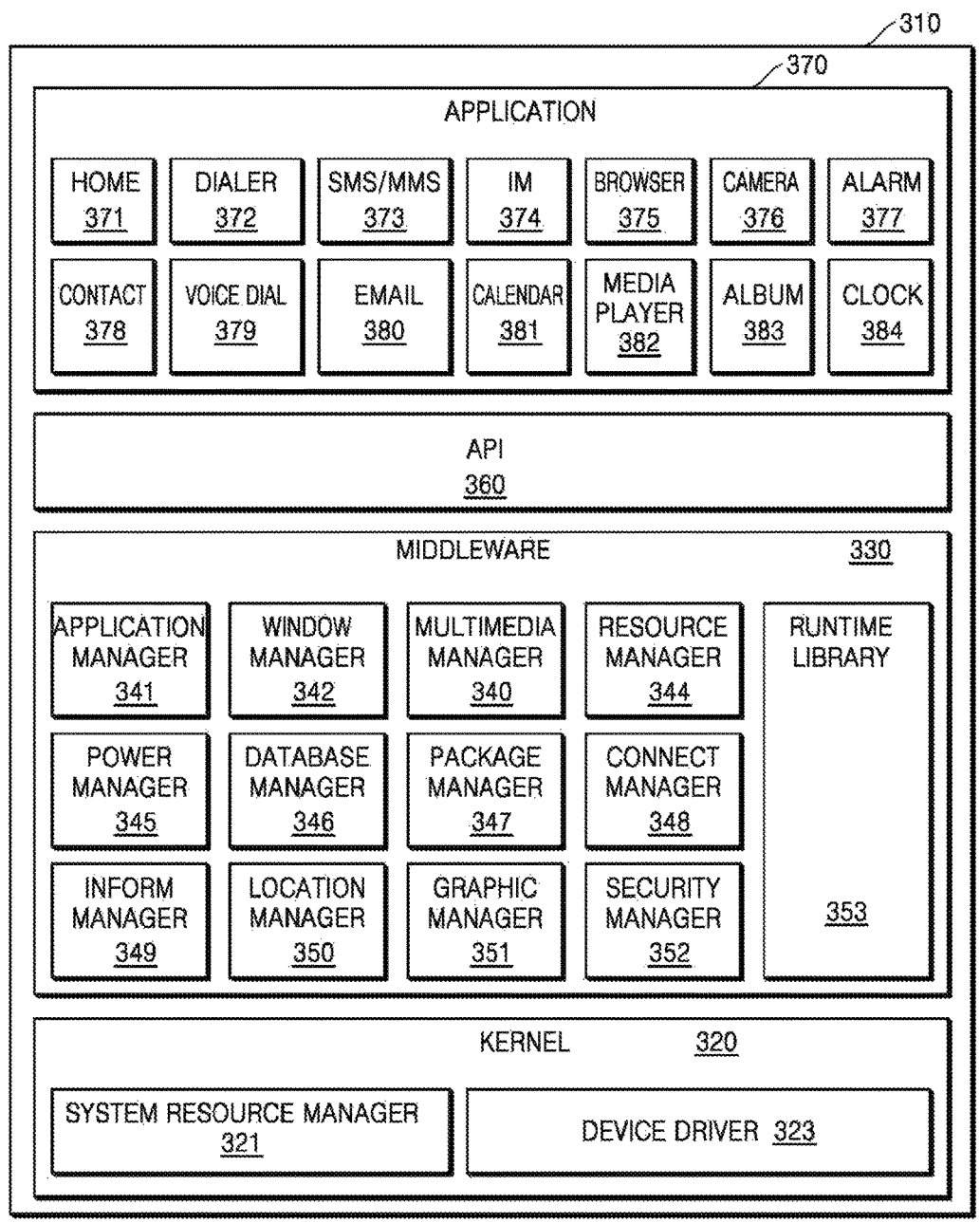
FIG. 3 is a schematic block diagram of a program module according to various embodiments.

FIG. 3 is a block diagram of a program module 310 according to various embodiments. According to an embodiment, the program module 310 (for example, the program 140) may include an OS controlling resources related to an electronic device (for example, the photographing apparatus 101), and/or various applications (for example, the application program 147) driven on the OS. The OS may include, for example, android, iOS, windows, symbian, tizen, bada, etc.

The program module 310 may include a kernel 320, middleware 330, an API 360, and/or an application 370. At least a portion of the program module 310 may be preloaded to the electronic device or may be downloaded from an external electronic device (for example, the electronic device 102 or 104, the server 106, or the like).

The kernel 320 (for example, the kernel 141) may include, for example, a system resource manager 321 and/or a device driver 323. The system resource manager 321 may perform controlling, assigning, or retrieving of a system resource. According to an embodiment, the system resource manager 321 may include a process management unit, a memory management unit, a file system management unit, or the like. The device driver 323 may include, for example, a display driver, a camera driver, a Bluetooth driver, a shared memory driver, a USB driver, a keypad driver, a Wifi driver, an audio driver, or an inter-process communication (IPC) driver.

The middleware 330 may, for example, provide a function commonly needed by the application 370 or may provide various functions to the application 370 via the API 360 so that the application 370 may effectively use a limited system resource in the electronic device. According to an embodiment, the middleware 330 (for example, the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The middleware 330 may include a middleware module forming a combination of various functions of the described components. The middleware 330 may provide a specified module according to a type of the OS in order to provide a differentiated function. Also, the middleware 330 may dynamically delete some of the previous components or add new components.

The API 360 (for example, the API 145) is for example a set of API programming functions. The API 360 may be provided as a different structure according to an OS. For example, in the case of android or iOS, one API set may be provided per platform, and in the case of tizen, two or more API sets may be provided per platform.

The application 370 (for example, the application program 147) may include one or more applications which may perform, for example, a function of a home 371, a dialer 372, SMS/MMS 373, instant message (IM) 374, a browser 375, a camera 376, an alarm 377, a contact 378, a voice dial 379, an email 380, a calendar 381, a media player 382, an album 383, a clock 384, health care (for example, measurement of an exercise quantity or blood sugar), or provision of environmental information (for example, atmospheric pressure, humidity, or temperature information).

According to various embodiments, at least some of the program module 310 may be realized as software, hardware, or a combination of the at least two. At least some of the program module 310 may be implemented (for example, executed) by, for example, the processor (for example, the processor 210). At least some of the program module 310 may include, for example, a module, a program, a routine, sets of instructions, processes, or the like, in order to perform one or more functions.

At least some of the devices (for example, modules or their functions) or of methods (for example, operations) according to various embodiments may be, for example, implemented as instructions stored in computer-readable storage media. If the instruction is executed by the processor (for example, the processor 120), the one or more processor may perform a function corresponding to the instruction. The computer-readable storage media may include, for example, the memory 130.

The modules or the program modules according to various embodiments may include at least one of the components described above, may omit some of the components described above, or may additionally include other components. Operations performed by the modules, the program modules, or the other components may be performed sequentially, in parallel, repetitively, or heuristically. Also, some of the operations may be performed in a different order or may be omitted, and other operations may be added. It should be understood that embodiments described herein should be considered in a descriptive sense only and not for purposes of limitation. Descriptions of features or aspects within each embodiment should typically be considered as available for other similar features or aspects in other embodiments.

Figure 4A:
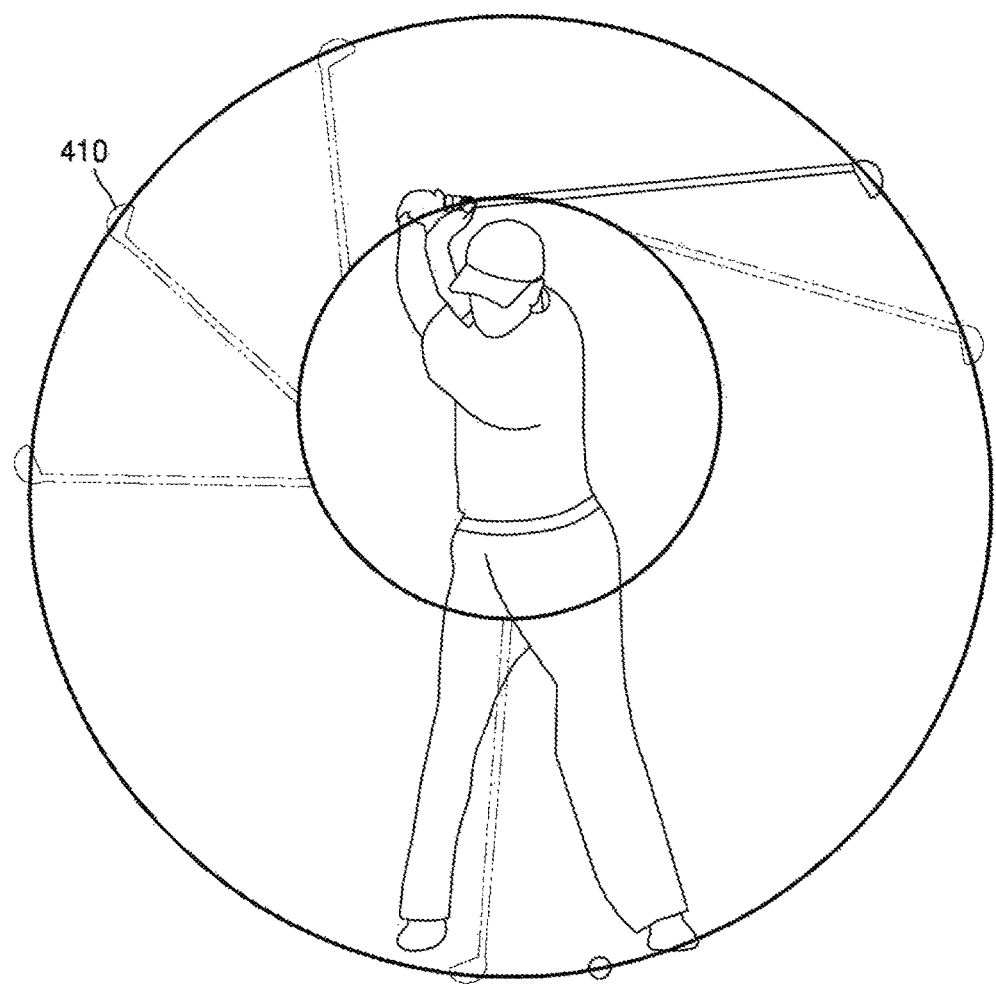
FIG. 4A is a view of an example of a golf swing movement as an object of photographing according to an embodiment.

FIG. 4A is a view of an example of a golf swing movement which is an object of photographing, according to an embodiment. The golf swing movement may denote a series of movements hitting a golf ball via a golf club based on a centrifugal force with the cervical vertebrae, etc. as a rotational axis, by which the golf club is swung.

In the golf swing movement, a circle or an oval drawn along a trace of a club head 410 may be referred to as a swing orbit.

Since it is a very short moment between a start of the swing movement and a finish of the swing movement, it may not be easy to capture and photograph one or more region of interests, in the series of swing movements.

The region of interest may denote a region that a user tries to photograph via the photographing apparatus 101, during the series of swing movements. For example, the region of interest may include a back swing top moment, an impact moment in which the gold club head 410 hits the ball, a moment in which the hit ball proceeds forward, a release moment, a finish moment, a follow through moment, etc. Also, the region of interest may not only include an instant moment, such as the impact moment, but also a certain section, such as a region during a moment in which the golf club head 410 moves within 30 centimeters before and after the impact moment, including a region during the impact moment, and a region during a moment in which the golf club head 410 moves within 30 centimeters before and after the back swing top.

In some embodiments, a swing moment that has a high frequency of being selected as a region of interest may be pre-defined based on a location, a rotational angle, etc. of the golf club. For example, if the club or a hand is located at a navel front of the user, it may be defined as the impact moment.

In this description, the rotational angle may indicate a degree of progress of rotation of a swing start portion based on a swing object. According to another embodiment, the rotational angle may have a different reference point, such as a horizontal plane which is parallel to a ground surface.

Figure 4B:
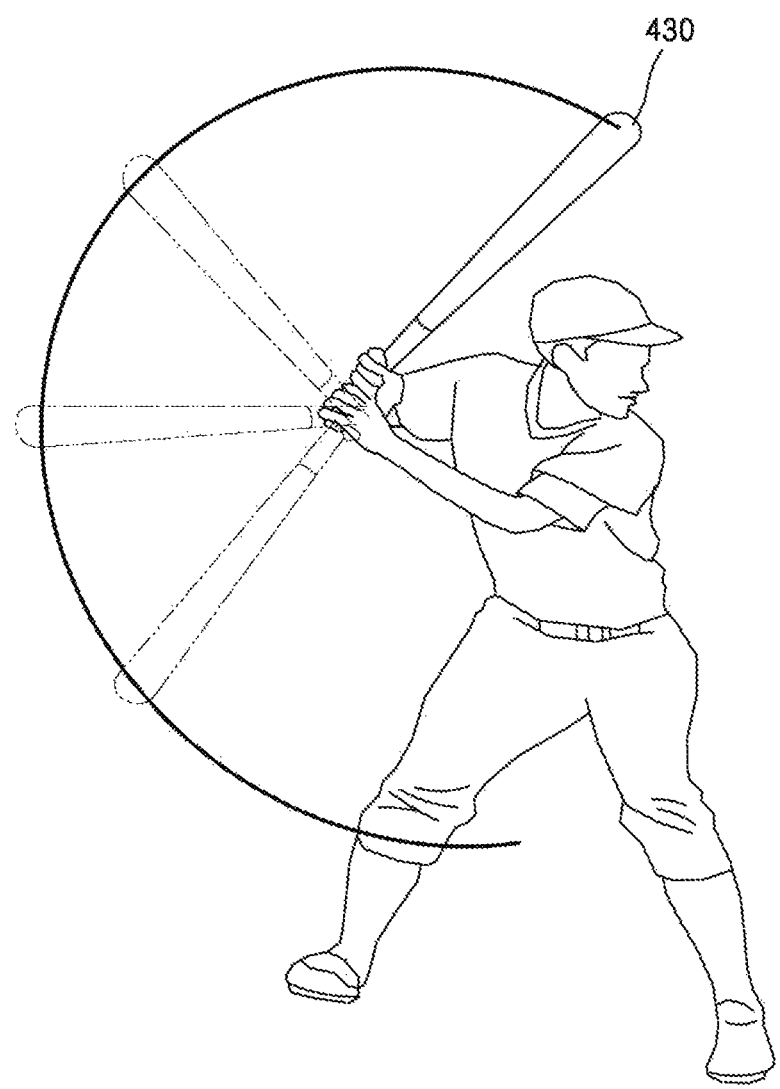
FIG. 4B is a view of an example of a baseball swing movement as an object of photographing according to an embodiment.

FIG. 4B is a view of an example of a baseball swing movement which is an object of photographing, according to an embodiment. The baseball swing movement refers to a series of movements in which a batter swings a bat in order to hit a baseball.

In the baseball swing movement, a circle drawn along a trace of an end of a bat 430 that is far from a user may be referred to as a swing orbit.

Since it is a very short moment between a start of the swing movement and a finish of the swing movement, it may not be easy to capture and photograph one or more region of interests, in the series of swing movements.

The region of interest may denote a region that a user tries to photograph via the photographing apparatus 101, during the series of swing movements. For example, the region of interest may include a moment in which the bat 430 hits the baseball, a moment in which the hit ball proceeds forward, a back swing top moment, etc. Also, the region of interest may not only include an instant moment, but also a certain section, such as a region during a moment in which the bat 430 moves within 30 centimeters before and after the hitting, including a region during the hitting moment, and a region during a moment in which the bat 430 moves within 30 centimeters before and after the back swing top.

In some embodiments, a swing moment that has a high frequency of being selected as a region of interest may be pre-defined according to a location, a rotational angle, etc. of the bat 430.

In this description, the term "swing movement" may not only include the golf swing movement of FIG. 4A and the baseball swing movement of FIG. 4B, but also various forms of swing movements. For example, an arm movement when a pitcher or a fielder throws a ball in baseball, a movement of throwing a fishing gut for fishing, and a movement of swinging a racket to hit a ball in tennis or badminton may also be included in the swing movement.

The photographing apparatus 101 according to an embodiment may efficiently capture and photograph one or more region of interests during a swing movement that is performed for a very short moment. The photographing may be automatically or manually performed.

Figure 5:
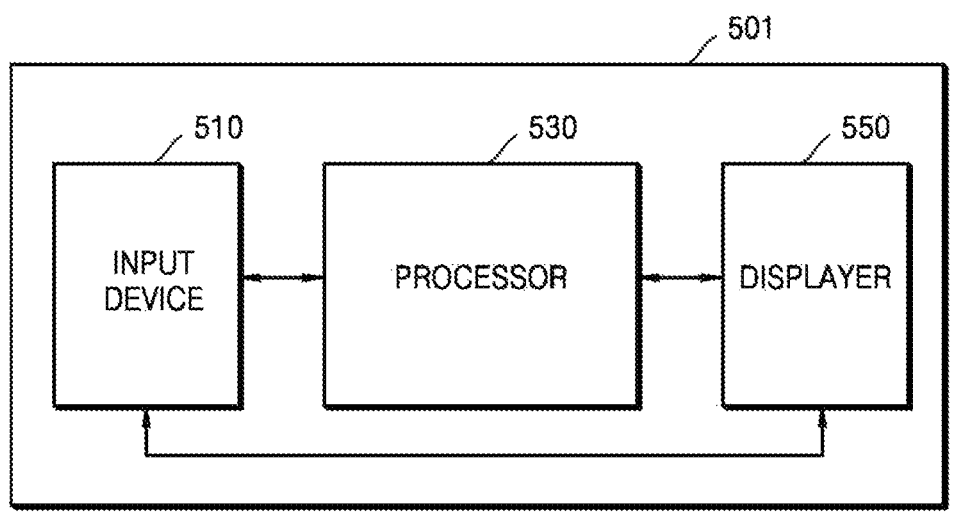
FIG. 5 is a schematic block diagram of a photographing apparatus according to an embodiment.

FIG. 5 is a schematic block diagram of a photographing apparatus 501 according to an embodiment. The photographing apparatus 501 may include an input device (e.g., including input circuitry) 510, a processor 530, and a displayer (e.g., including a display) 550.

The input device 510 may receive an input with respect to which movement during a swing movement is a region of interest, from a user or an external device, and transmit the received input to the processor 530. Various methods, according to which the input device 510 receives the region of interest, will be described below with reference to FIG. 7.

The processor 530 may control the photographing apparatus 510 to predict a swing orbit based on a portion of a swing movement displayed on the displayer 550, correct the predicted swing orbit, and determine a photographing point in time with respect to the region of interest, based on the corrected swing orbit, and photograph a subject at the determined point in time of photographing.

The processor 530 may extract a swing object from a received image.

The processor 530 may predict a whole swing orbit based on a portion of a live view image displayed on the displayer 550. For example, when a golf swing movement is divided into address, back swing, back swing top, down swing, impact, follow through, and finish, the processor 530 may predict the whole swing orbit of the case in which the movement is performed up to the finish, based on the orbit of the case when the movement is performed up to the address and the back swing.

Detailed methods of correcting the predicted swing orbit will be described later.

The processor 530 may determine the point in time of photographing by automatically taking into account a time that is taken for an image sensor to end a corresponding live view and prepare a still image from a moment in which the photographing is instructed, and a time that is taken for a shutter to be actually released.

The processor 530 may control the photographing apparatus 501 to perform photographing at the determined point in time of photographing.

The displayer 550 may display an image signal that is input via a sensor, as a live view image. Also, the displayer 550 may receive a previously photographed image from a memory and display the photographed image.

In the present embodiment, the input device 510, the processor 530, and the displayer 550 are described as separate components. However, in some embodiments, the input device 510, the processor 530, and the displayer 550 may be combined and integrally implemented.

Also, in the present embodiment, the input device 510, the processor 530, and the displayer 550 are represented to be located in the photographing apparatus 501 to be adjacent to one another. However, it is not necessary that devices performing functions of the input device 510, the processor 530, and the displayer 550 are physically adjacent to one another. Thus, the input device 510, the processor 530, and the displayer 550 may be separated from one another, according to embodiments.

Also, the photographing apparatus 501 is not limited to a physical apparatus, and some of the functions of the photographing apparatus 501 may be implemented as software rather than hardware.

In some embodiments, the photographing apparatus 501 may further include a photographing unit. The photographing unit may convert light that is input via a provided lens into an image signal via an imaging sensor.

Figure 6:
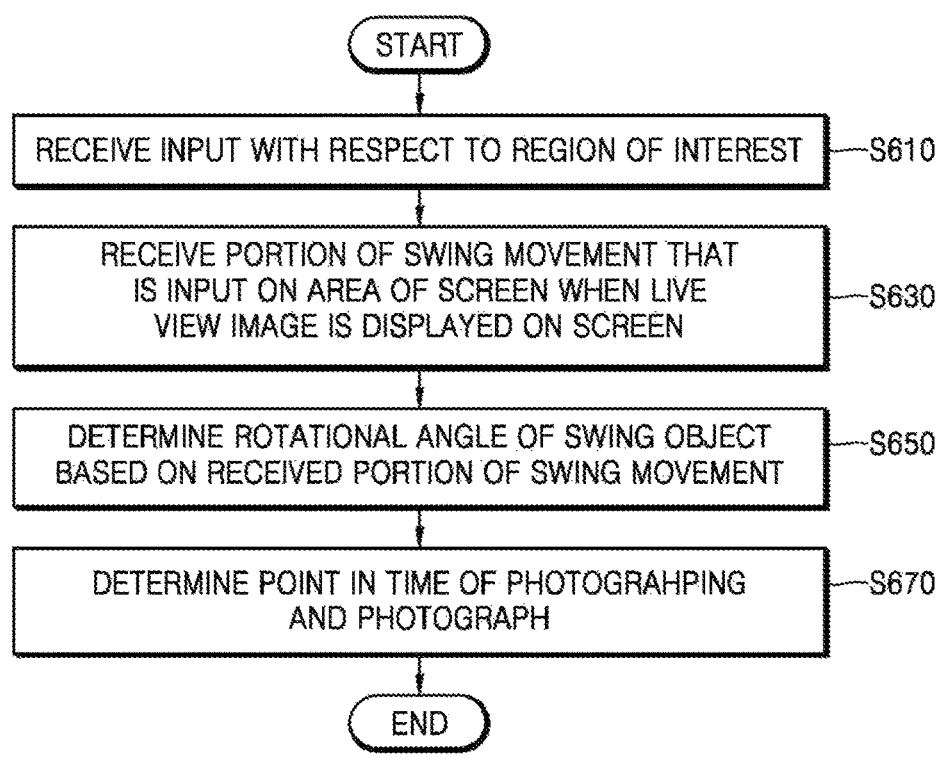
FIG. 6 is a flowchart of a method of controlling a photographing apparatus, according to an embodiment.

FIG. 6 is a flowchart of a method of controlling the photographing apparatus 501, according to an embodiment.

In operation S610, the photographing apparatus 501 may receive an input with respect to a region of interest. In some embodiments, the photographing apparatus 501 may select a type of swing movement. In some embodiments, the photographing apparatus 501 may receive an input with respect to a moment or a section in a series of swing movements, which a user especially tries to photograph, that is, a region of interest. The region of interest may be a region, such as a wrist region, a shoulder region, a hit region, etc. of the whole image of the moment or the section that the user especially tries to photograph.

In some embodiments, the photographing apparatus 501 may select a method of photographing the region of interest. For example, the photographing apparatus 501 may photograph the region of interest as a still image, may photograph the region of interest by enlarging the region of interest, or photograph whole or part of the region of interest by changing a setting of a photographing environment, such as frames per second (FPS) or resolution.

In operation S630, the photographing apparatus 501 may receive a portion of a swing movement, which is input in an area of a screen, in a state in which a live view image is displayed on the screen.

The portion of the swing movement may be a moment between a start of the swing movement and another point of the swing movement, or a moment between a middle of the swing movement and another point of the swing movement.

In operation S650, the photographing apparatus 501 may determine a rotational angle of a swing object, based on the received portion of the swing movement. A location of the current swing object may be got from the rotational angle of the swing object.

According to an embodiment, the photographing apparatus 501 may predict a swing orbit based on the received portion of the swing movement. According to an embodiment, the photographing apparatus 501 may update the predicted swing orbit according to a degree of progress of the swing movement. For example, when a swing orbit that is predicted when 20% of the swing movement is received and a swing orbit that is predicted when 50% of the swing movement is received do not correspond to each other, the predicted swing orbit may be updated to the swing orbit that is predicted when 50% of the swing movement is received.

In some embodiments, the photographing apparatus 501 may determine whether a type of the swing orbit is a circle, an oval, or another type of oval, based on a pre-received practice swing movement, and may predict the swing orbit according to an appropriate method for each case. In this specification, the practice swing movement may denote swinging into the air without hitting a ball before the actual swing movement in golf, baseball, or the like.

The photographing apparatus 501 may correct the predicted swing orbit. According to an embodiment, the photographing apparatus 501 may correct at least one of distortion due to an angle between a reference plane and a swing object, distortion due to an angle between the photographing apparatus 501 and a subject, and a reading angle error of a sensor with respect to an object moving in a horizontal direction during a rolling shutter operation. Detailed correction methods will be described later.

According to an embodiment, the photographing apparatus 501 may search for an actual rotational angle of the swing object based on a rotational angle of the swing object displayed on the live view. In this case, the relations between the rotational angle of the swing object displayed on the live view and the actual rotational angle of the swing object may be defined by pre-learned data.

In operation S670, the photographing apparatus 501 may predict a rotational angle of the swing object after a certain time period passes, based on the determined rotational angle of the swing object, and may photograph the region of interest by determining a point in time of photographing with respect to the region of interest.

The point in time of photographing may be determined by taking a swing speed into account.

In operation S650, the point in time of photographing may be determined by taking into account a time interval between a point in time at which a photographing instruction is received and a point in time at which the photographing is performed, and taking into account a predicted location of the swing object on the swing orbit which is corrected after the corresponding time interval.

According to an embodiment, the photographing apparatus 501 may determine the point in time of photographing by calculating the time interval between the point in time at which the photographing instruction is received and the point in time at which the photographing is performed. The time interval between the point in time at which the photographing instruction is received and the point in time at which the photographing is performed may be determined according to a shutter lag, a light exposure time of the sensor, etc.

Figure 7:
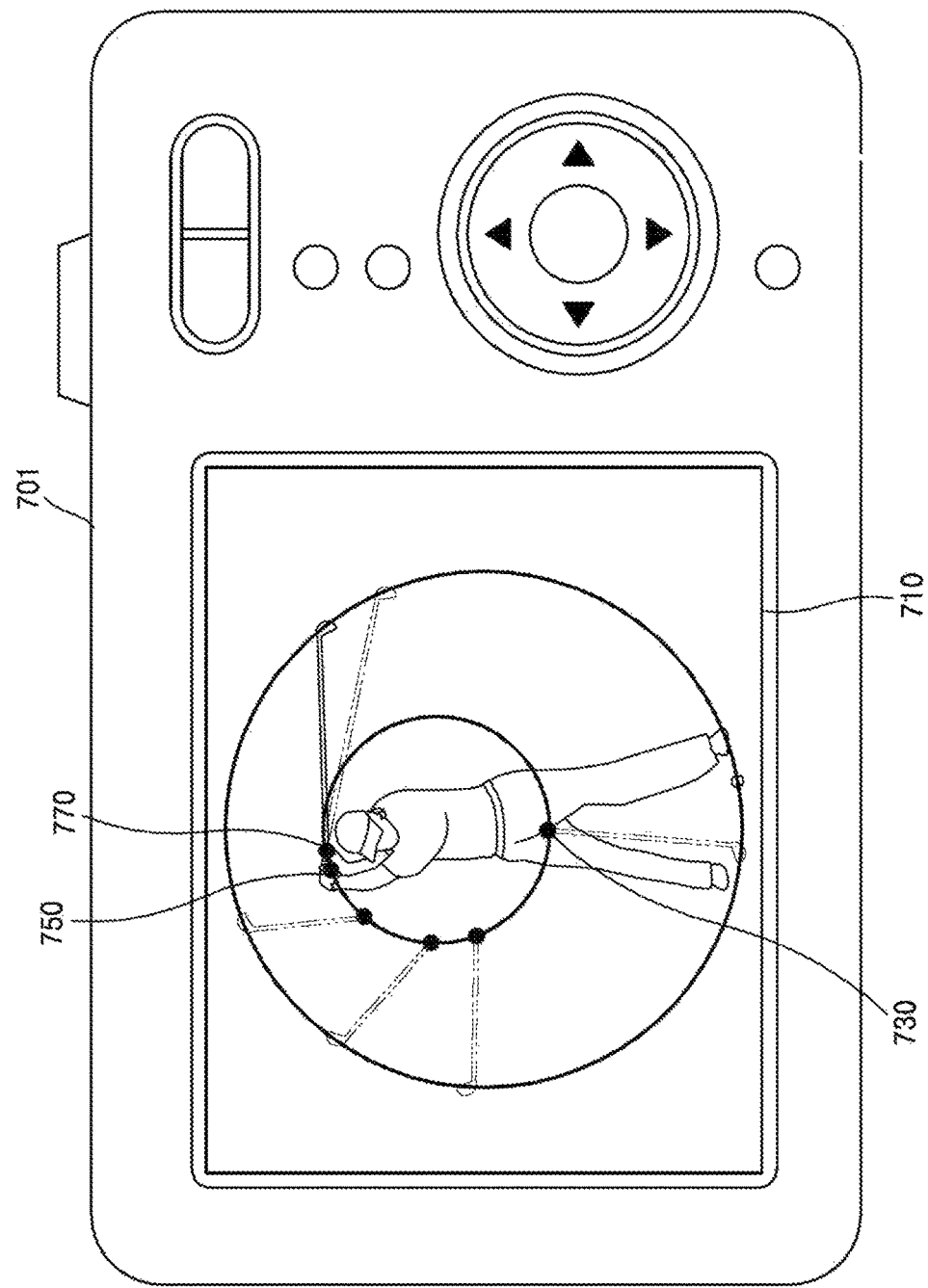
FIG. 7 is a view of an example in which a photographing apparatus receives an input with respect to an object of interest, according to an embodiment.

FIG. 7 is a view of an example in which a photographing apparatus 701 receives an input with respect to a region of interest, according to an embodiment. In the present embodiment, the photographing apparatus 701 may display a swing movement sample on a displayer 710 so that a user may input a region of interest.

The swing movement sample displayed on the displayer 710 may include important points, such as an impact moment 730, a back swing top moment 750, a finish moment 770, etc. The user may select at least one of the displayed points as the region of interest.

In some embodiments, the user may select a certain section, such as a section between the back swing top moment 750 and the impact moment 730, as the region of interest. The selection of the region of interest may be performed by various methods, such as dragging, touching, clicking, etc., by using various input devices including input circuitry, such as a touch screen, a mouse, a touch pad, a keyboard, etc. In some embodiments, the receiving of the input with respect to the region of interest may include automatically receiving an input with respect to a certain area or manually receiving the input. For example, the photographing apparatus 701 may be set such that the impact moment 730 is automatically input as the region of interest, or may be set such that an input of the region of interest is received manually every time the photographing is performed.

In some embodiments, the photographing apparatus 701 may receive an input with respect to which type of swing movement is to be photographed, from a user. Types of the swing movement may include a golf swing movement, a baseball bat swing movement, a baseball pitching swing movement, a tennis swing movement, etc.

In other embodiments, the photographing apparatus 701 may receive an input with respect to a photographing method of the region of interest. The input with respect to the photographing method may denote selecting one or more out of still image photographing, high resolution photographing, specific part enlarged photographing, video photographing, sequential photographing, photographing by changing FPS, etc.

In some embodiments, when the photographing apparatus 701 receives an input of a plurality of regions of interest, the photographing apparatus 701 may perform photographing as many times as the number of the received regions of interest.

In some embodiments, resolution may not be changed during the photographing, and a resolution with respect to a region of interest may be changed in a photographed image.

In some embodiments, the photographing apparatus 701 may display a swing speed on a live view, or store the swing speed together with a photographed image and display the swing speed together with the photographed image. The swing speed may be displayed in a form of at least one of a number, a color, and a graph.

Figure 8A:
FIG. 8A is a view of an example of swing orbit distortion occurring according to an angle between a reference plane and a swing object, when a swing movement is photographed, according to an embodiment.
Figure 8B:
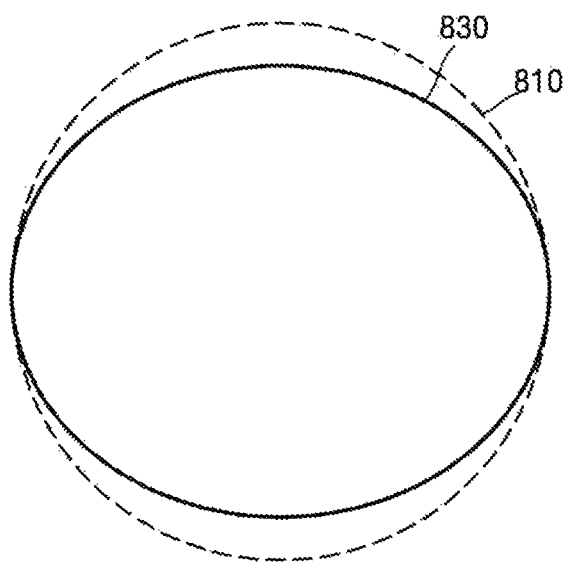
FIG. 8B is a view of an example of swing orbit distortion occurring according to an angle between a reference plane and a swing object, when a swing movement is photographed, according to an embodiment.

FIGS. 8A and 8B are views of examples of swing orbit distortion occurring according to an angle between a reference plane and a swing object when photographing a swing movement, according to an embodiment.

The swing orbit may be modeled as a formula of a circle or an oval based on a swing central axis. However, the swing movement is performed in a three-dimensional space, and thus, the swing orbit received via the live view of the photographing apparatus 701 may be distorted according to an angle between the reference plane and the swing object.

In the embodiment illustrated in FIG. 8A, the reference plane is a ground surface, and the swing object may be a golf club. The ground surface and the swing object may be tilted by an angle A.

Thus, the swing orbit in the two-dimensional view has a circular shape as 510 of FIG. 8B, while the swing orbit received via the live view of the photographing apparatus 701 may have an oval shape as 530 of FIG. 8B.

The swing orbit 530 received via the live view of the photographing apparatus 701 is an orbit distorted due to the tilt A, and thus, in order to photograph the region of interest at an accurate point in time, the distorted orbit has to be corrected. Detailed correction methods will be described later.

Figure 9A:
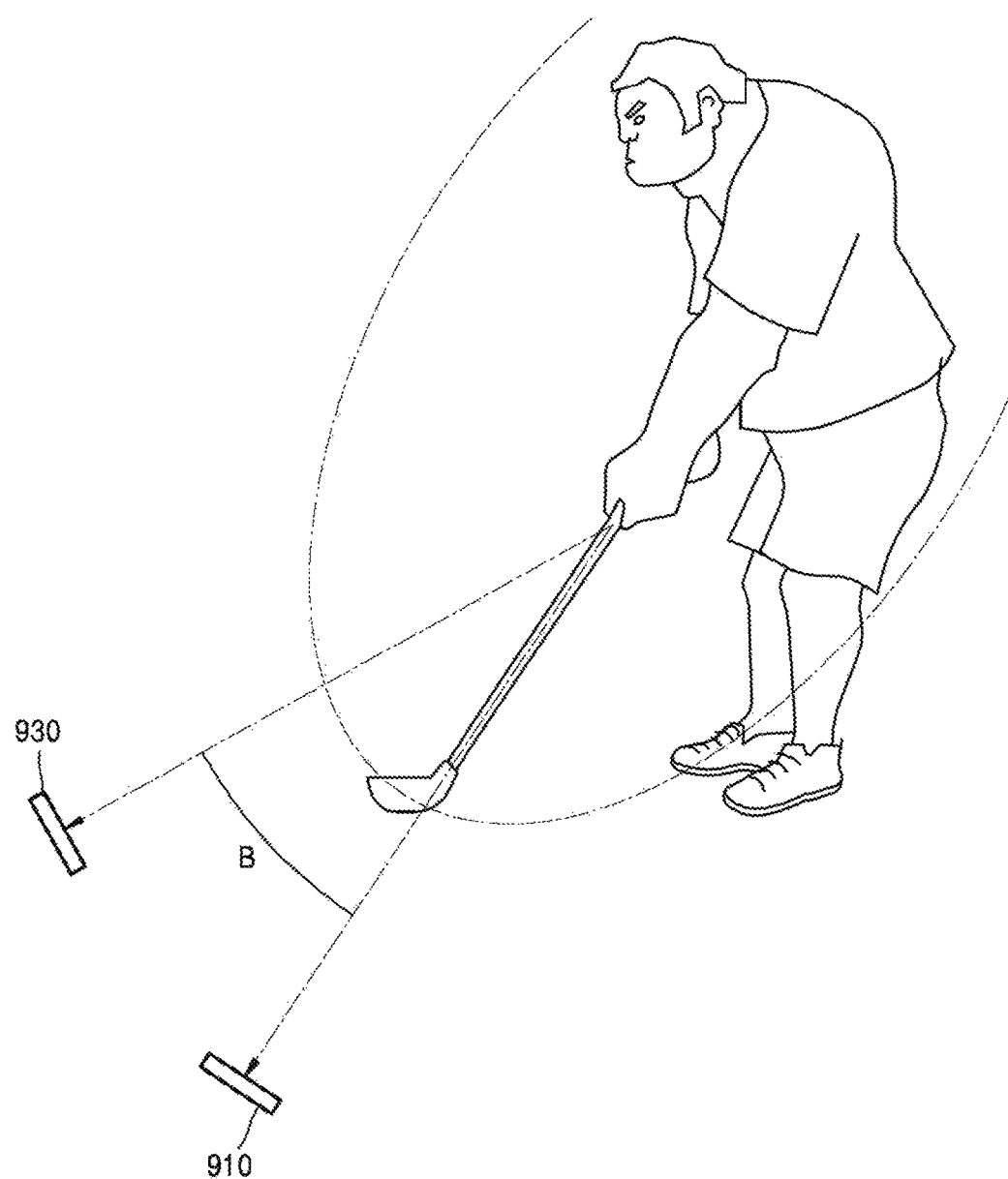
FIG. 9A is a view of an example of swing orbit distortion occurring according to an angle between a photographing apparatus and a subject, when a swing movement is photographed, according to an embodiment.
Figure 9B:
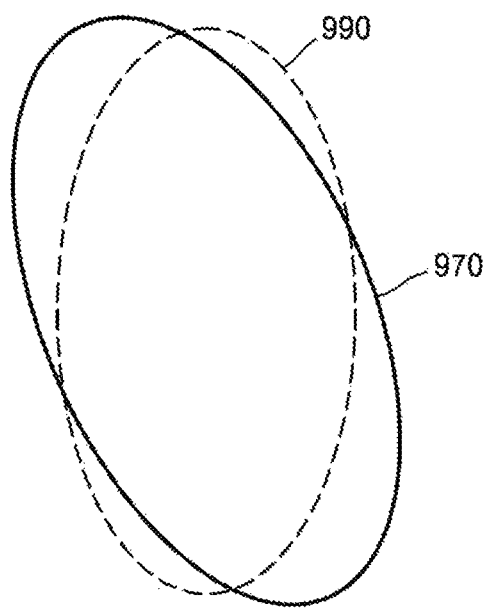
FIG. 9B is a view of an example of swing orbit distortion occurring according to an angle between a photographing apparatus and a subject, when a swing movement is photographed, according to an embodiment.

FIGS. 9A and 9B are views of examples of swing orbit distortion occurring according to an angle between the photographing apparatus 701 and a subject when photographing a swing movement, according to an embodiment.

The swing orbit may be modeled as a formula of a circle or an oval having a swing central axis as a basis. However, according to a location of the photographing apparatus 701 photographing the swing movement, the swing orbit received via the live view of the photographing apparatus 701 may be distorted.

When the photographing apparatus 701 photographs a subject at the front 910, there may be no distortion due to the location of the photographing apparatus 701.

However, when the photographing apparatus 701 photographs the swing movement at a left side 930 or a right side 950 of the subject, the swing orbit received via the live view of the photographing apparatus 701 may be distorted due to an angle B between the photographing apparatus 701 and the subject.

The subject may be a person performing various swing movements, such as a golf swing movement, a baseball swing movement, etc.

In the embodiment of FIG. 9A, when the photographing apparatus 701 photographs the swing object at the left side 930 of the subject, and the photographing apparatus 701 is spaced apart from the subject by an angle B, the actual swing orbit on a rotational plane has a shape as 990 of FIG. 9B, while the swing orbit received via the live view of the photographing apparatus 701 may have a distorted shape as 970 of FIG. 9B.

The swing orbit 970 received via the live view of the photographing apparatus 701 is an orbit distorted due to the angle B, and thus, in order to photograph the region of interest at an accurate point in time, the distorted orbit has to be corrected. The swing orbit 970 of FIG. 9B may further be distorted due to an angle between a reference plane and the swing object, in addition to an angle between the photographing apparatus 701 and the subject. Detailed correction methods will be described later.

Figure 10:
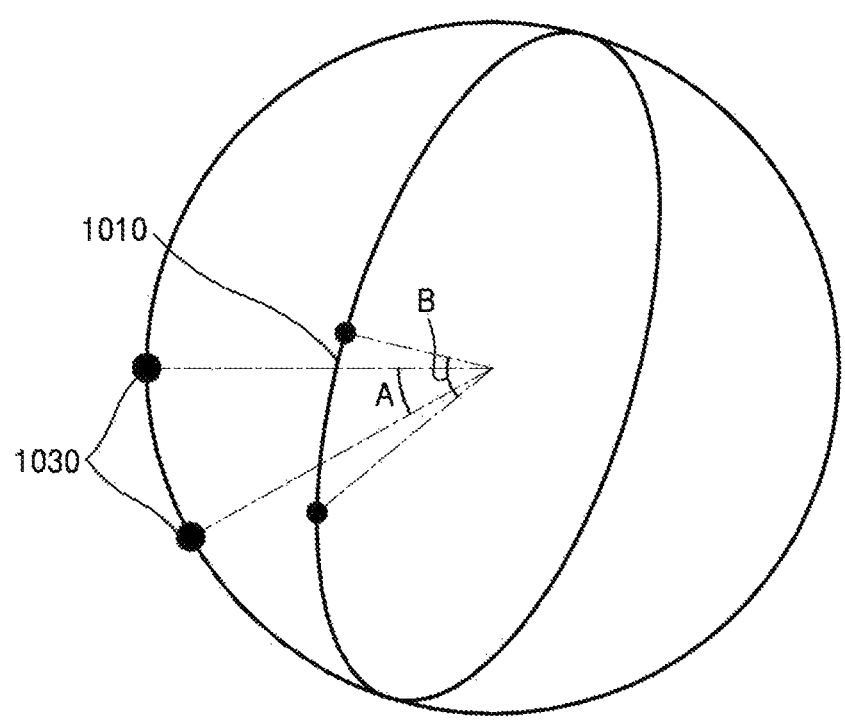
FIG. 10 is a view of an example of a distorted rotational angle and a corrected rotational angle, when a swing movement is photographed, according to an embodiment.

FIG. 10 is a view of an example of a distorted rotational angle and a corrected rotational angle when photographing a swing movement, according to an embodiment.

A swing orbit 1030 at an outer side is an orbit in the case in which photographing is performed when the photographing apparatus 701 is located vertically to a rotational plane of the swing orbit, and a swing orbit 1010 at an inner side is a swing orbit predicted based on a received portion of the swing movement, that is, a swing orbit distorted due to an angle α between a reference plane and a swing object and due to an angle β between the photographing apparatus 701 and a subject.

According to the distortion of the swing orbit, the rotational angle of the swing object may be distorted as B while the actual rotational angle is A. Thus, in order to determine an accurate point in time of photographing the region of interest, an actual rotational angle of the swing object has to be detected.

The original swing orbit 1030 may vary according to a swing subject, and thus, the photographing apparatus 701 may determine whether the original swing orbit 1030 has a circular shape or an oval shape, with reference to a practice swing movement of the swing subject, and may determine an original rotational angle depending on the determined shape of the original swing orbit.

Figure 11:
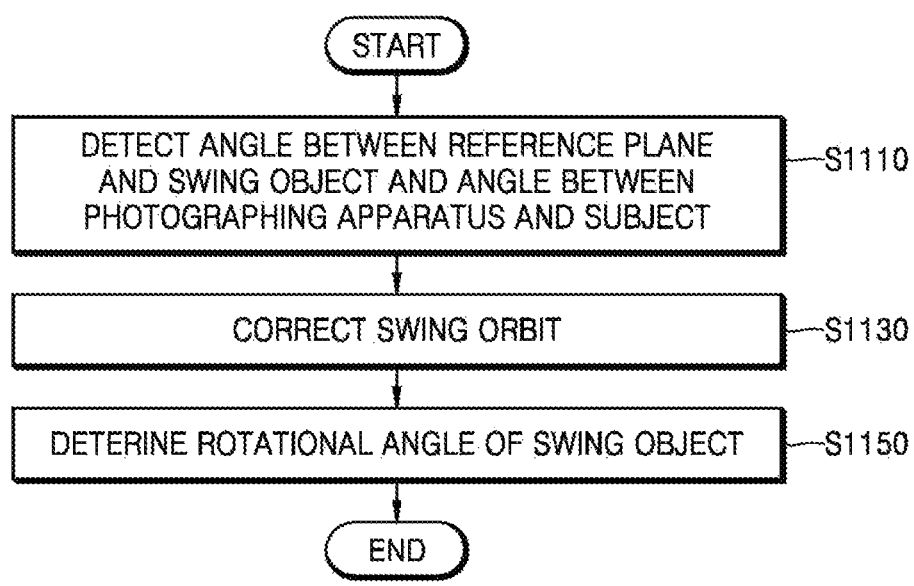
FIG. 11 is a flowchart of a method of determining a rotational angle of a swing object when photographing a swing movement, according to an embodiment.

FIG. 11 is a flowchart of a method of determining a rotational angle of a swing object when photographing a swing movement, according to an embodiment. The photographing apparatus 701 may determine an actual rotational angle of the swing object by correcting swing orbit distortion, when photographing the swing movement.

The photographing apparatus 701 may receive a portion of the swing movement, which is input in an area of a screen, in a state in which a live view image is displayed on the screen, and may predict a swing orbit based on the received portion of the swing movement. The predicted swing orbit may include distortion due to the angle between the reference plane and the swing object and due to the angle between the photographing apparatus 701 and the subject, as described in FIGS. 8B and 9B.

In operation S1110, the photographing apparatus 701 may detect an angle between the reference plane and the swing object and an angle between the photographing apparatus 701 and a subject. The photographing apparatus 701 may detect the angle between the reference plane and the swing object and the angle between the photographing apparatus 701 and the subject, by using a normal equation of a circle or an oval.

For example, when the original swing orbit is oval, the angle between the reference plane and the swing object and the angle between the photographing apparatus 701 and the subject may be detected as follows.

$$A'x2+B'xy+C'y2+D'x+E'y-1=0 \quad \text{[Equation 1]}$$

Equation 1 is an oval equation having A', B', and C' as coefficients determining a shape of the oval. Equation 1 may denote the swing orbit predicted based on the received portion of the swing movement, that is, a swing orbit containing distortion. A', B', and C' may be constants.

$$A(\alpha,\beta)x2+B(\alpha,\beta)xy+C(\alpha,\beta)y2+D(\alpha,\beta)x+E(\alpha,\beta)y-1=0 \quad \text{[Equation 2]}$$

Equation 2 may be an oval equation indicating how a specific swing orbit, that is, an oval may be shown distorted due to an angle α between a reference plane and a swing object and due to an angle β between the photographing apparatus 701 and a subject. The specific swing orbit may denote an original swing orbit in which the swing movement is not distorted.

In Equation 2, A(α, β) may be a specific formula including the angles α and β. Equation 2 may be changed according to a user setting, a discovery of a new formula, etc.

If it is assumed that Equation 2 indicating the swing orbit that is tilted by the angle α between the reference plane and the swing object and the angle β between the photographing apparatus 701 and the subject, corresponds to Equation 1, each of α and β may be calculated via the relations between A(α, β) and A', between B(α, β) and B', and between C(α, β) and C'.

The swing orbit may have different shapes according to swing subjects. For example, one person may have a circular swing orbit, another person may have a swing orbit of an oval shape which is longer in a vertical direction than the circular shape, and yet another person may have a swing orbit of an oval shape which is longer in a horizontal direction than the circular shape. In this case, a formula including a parameter a representing a degree of distortion of the orbit may be produced.

$$\alpha=a\cos(\text{sqrt}(\cos\_sq)) \quad \text{[Equation 3]}$$

In Equation 3, a is an angle between a reference plane and a swing object, a cos is a reversed function of a cosine (cos) function, sqrt denotes the square root, and cos_sq is an intermediate variable, which may be calculated as follows.

$$\cos\_sq=2*A'*(b-\text{sqrt}(b*b-ac))/(4*A'*C'-B'*B') \quad \text{[Equation 4]}$$

If cos_sq is greater than 1 or less than −1, it may be calculated as follows.

$$\cos\_sq=2*A'*(b+\text{sqrt}(b*b-ac))/(4*A'*C'-B'*B') \quad \text{[Equation 5]}$$

In Equation 4 and Equation 5, b and ac are intermediate variables, which may be obtained as follows.

$$b=C'+A'^*a-B'^*B'^*(1-a)/(4^*A) \qquad [\text{Equation 6}]$$

$$ac=(4A'^*C'-B'^*B')^*a \qquad [\text{Equation 7}]$$

Also, the angle β between the photographing apparatus 701 and the subject may be obtained as follows.

If an absolute value of α is greater than 0, s=B'/(2*A'*tan(α)) and β=a sin(s).

If an absolute value of a is equal to or less than 0, c=sqrt(C'/(a*A')) and, β=a cos(c).

Here, s and c are intermediate variables.

In some embodiments, various parameters of a photographing apparatus, such as a focal distance of a camera, etc., may be used to determine α and β.

In operation S1130, the photographing apparatus 701 may correct distortion of the swing orbit. The photographing apparatus 701 may restore the original swing orbit by correcting distortion of the swing orbit based on the angle α between the reference plane and the swing object, and the angle β between the photographing apparatus 701 and the subject, which are obtained in operation S1010.

The calculation method using the equations according to the present embodiment is only an example of correcting the swing orbit, and the swing orbit may be corrected by using various other methods.

In operation S1150, the photographing apparatus 701 may determine a rotational angle of the swing object.

The photographing apparatus 701 may determine an actual rotational angle of the current swing object based on the corrected swing orbit. The photographing apparatus 701 may determine a point in time of photographing to photograph the region of interest, based on the determined rotational angle.

Figure 12:
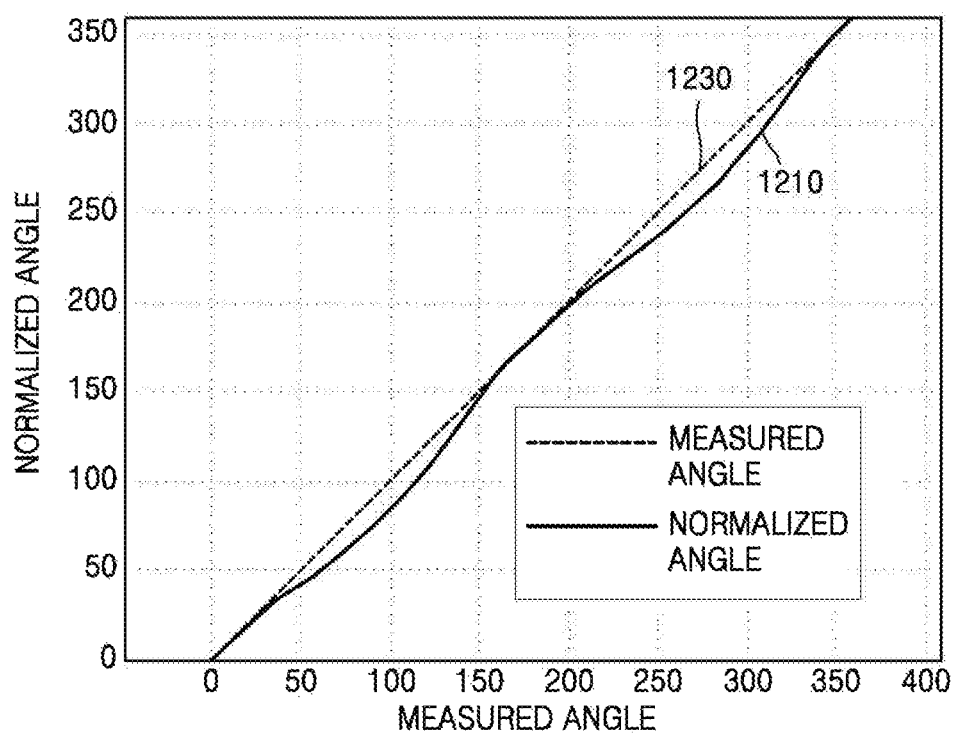
FIG. 12 is a view of an example of a method of determining a rotational angle of a swing object, according to an embodiment.

FIG. 12 is a view of an example of a method of determining a rotational angle of a swing object, according to an embodiment.

The photographing apparatus 701 may store data with respect to a rotational angle pre-detected via repeated learning according to the method of FIG. 10, and an actual rotational angle after correction. The learning data may be stored in an internal memory or a storage unit of the photographing apparatus 701, or an external storage device, as a table.

The photographing apparatus 701 may measure an ultimate rotational angle of the swing object that is received, when a portion of the swing movement is received via a live view, by using the stored data. A measured angle 1230 of FIG. 12 denotes a rotational angle measured in a state in which the portion of the swing movement is received by the photographing apparatus 701. A normalized rotational angle 1210 corresponding to each of the measured angles may be detected based on a table of FIG. 12. The normalized rotational angle denotes a rotational angle according to an actual swing orbit that is corrected by taking into account distortion due to the angle between the reference plane and the swing object and the angle between the photographing apparatus 701 and the subject.

The method of obtaining the actual rotational angle based on the table pre-defined by learning may prevent the calculation as in FIG. 10 from being repeatedly performed in each execution, and thus, the efficiency and the process speed of a processor may be improved.

Figure 13:
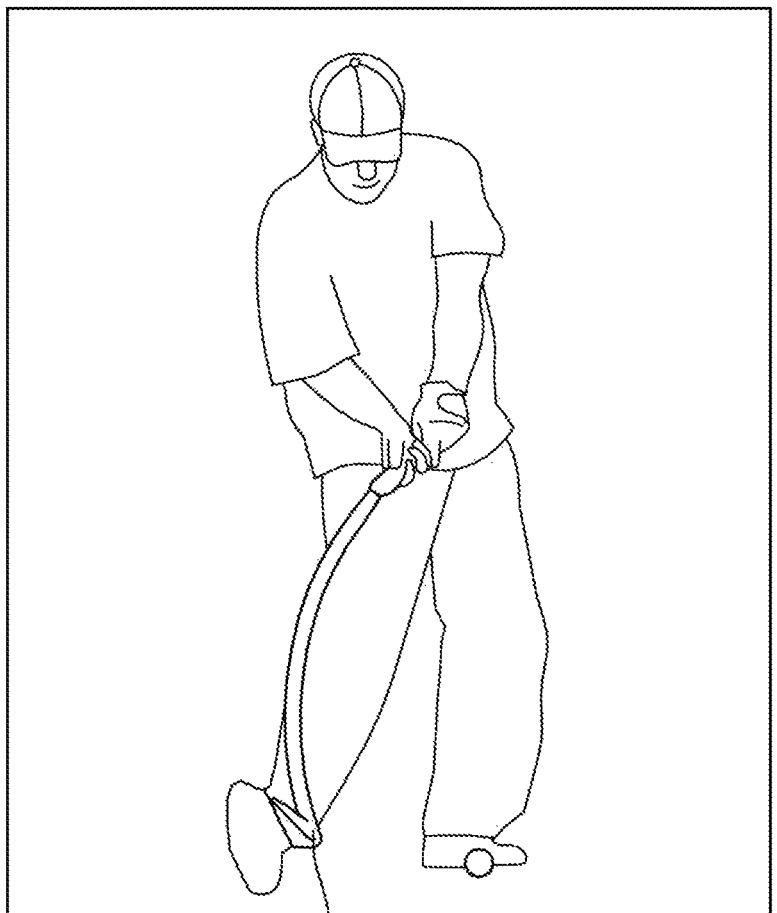
FIG. 13 is a view of an example of distortion according to a rolling shutter operation, when photographing a swing movement, according to an embodiment.

FIG. 13 is a view of an example of distortion due to a rolling shutter operation when photographing a swing movement, according to an embodiment. The photographing apparatus 701 may receive an image via an image sensor by using a rolling shutter method. The rolling shutter method refers to a method of nonlinearly scanning the sensor, when the image sensor receives a recognized image.

When the photographing apparatus 701 operates by the rolling shutter method, each row of the sensor takes a different time to scan an image, and thus, an object moving in a horizontal direction of the sensor may have different scanned locations per row. Thus, an aliasing effect may occur wherein a straight line is not recognized as straight due to a difference of an object reading angle error. For example, a golf club 1310 of FIG. 13 is recognized by the photographing apparatus 701 as bent, while the golf club 1301 has actually a straight shape.

Thus, when the photographing apparatus 701 reads the image sensor by using the rolling shutter method, an operation of correcting the reading angle error has to be performed first, in order to detect an accurate location and an accurate rotational angle of the swing object.

Figure 14A:
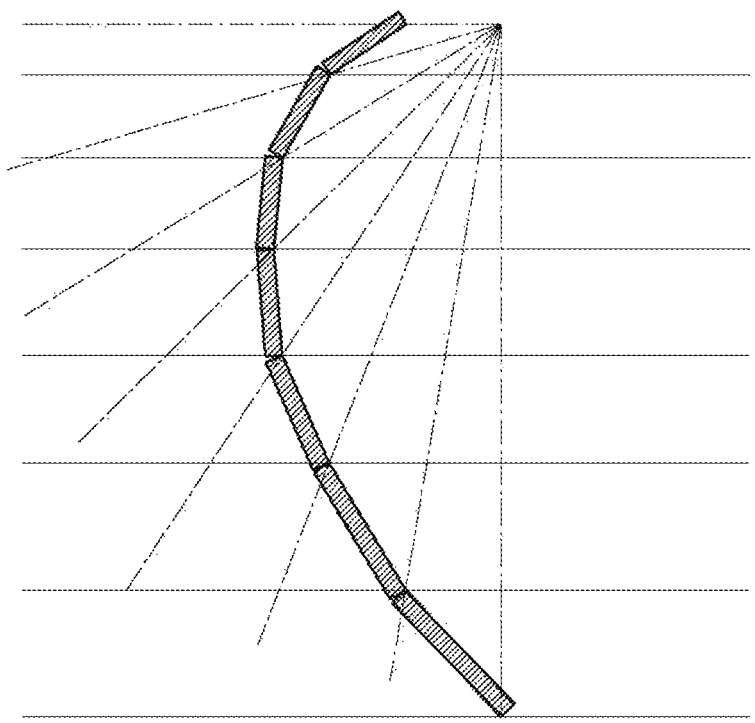
FIG. 14A is a view of an example of distortion according to a rolling shutter operation, when photographing a swing movement, according to an embodiment.

FIG. 14A is a view of an example of distortion according to a rolling shutter operation when photographing a swing movement, according to an embodiment. When photographing is performed by using the rolling shutter operation with respect to a horizontal movement of a swing object, when the straight swing object rotates, a rotational angle of the swing object that is read may vary for each row, due to a time difference that a sensor takes to read each row, as illustrated in FIG. 14A.

Figure 14B:
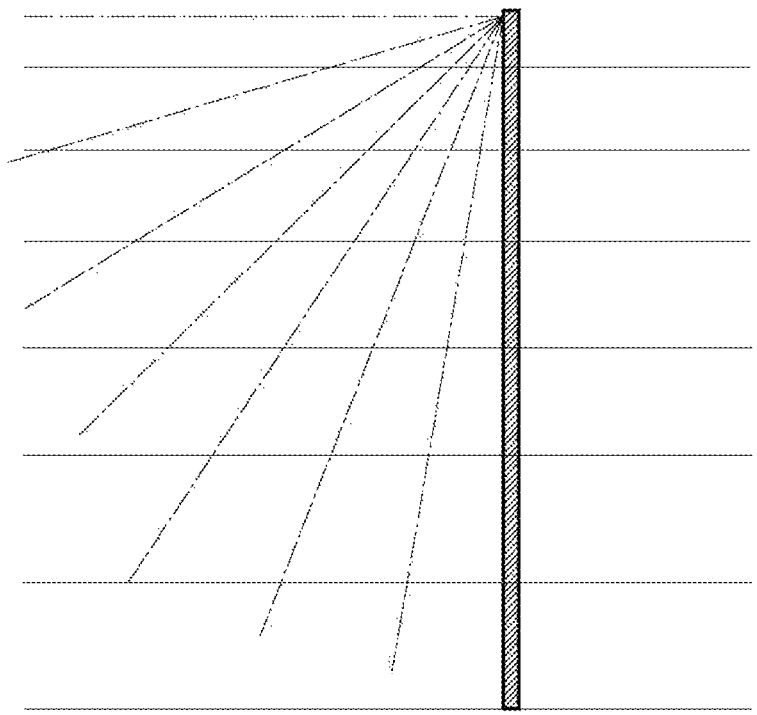
FIG. 14B is a view of an example of photographing according to a global shutter operation, when photographing a swing movement, according to an embodiment.

FIG. 14B is a view of an example of photographing according to a global shutter operation when photographing a swing movement, according to an embodiment. The global shutter operation refers to a method of reading every row at once without having a time difference between rows, when reading an image sensor. When the same swing object as illustrated in FIG. 14A is photographed by the global shutter method, the swing object may be recognized as the straight shape as illustrated in FIG. 14B.

Figure 15:
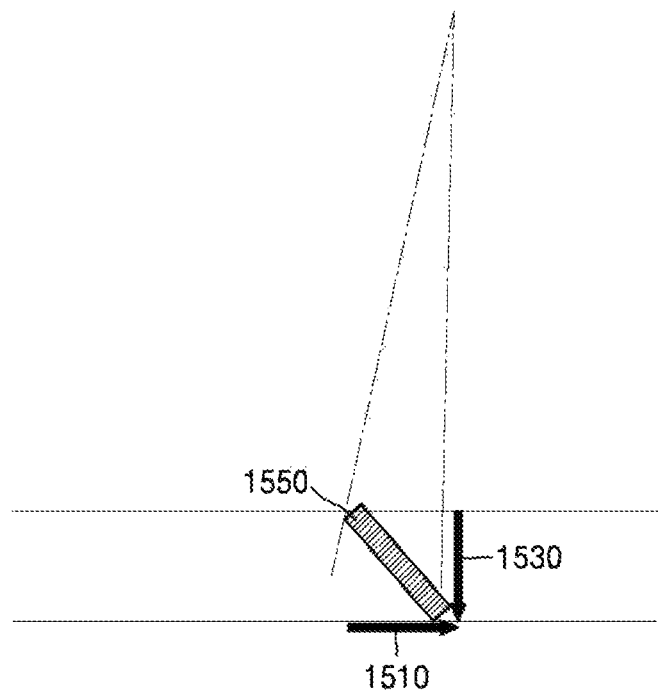
FIG. 15 is a view of an example of a method of correcting a distorted swing object according to a rolling shutter operation, when photographing a swing movement, according to an embodiment.

FIG. 15 is a view of an example of a method of correcting a swing object that is distorted according to a rolling shutter operation when photographing a swing movement, according to an embodiment. When the photographing apparatus 701 operates by a rolling shutter method, distortion of the object moving in a horizontal direction of the sensor may be corrected via a reading speed of the sensor per row, and a speed of the moving object.

The distortion of the object is represented in a direction of a sum vector 1550 of a vector 1510 of a speed of the object moving in a horizontal direction and a vector 1530 of a reading speed of the sensor. Here, the speed of the object moving in the horizontal direction may be calculated via an image received via a live view, and the reading speed of the sensor may be a pre-determined value.

Thus, correction may be performed in a reverse direction of the sum vector 1550 of the vector 1510 of the speed of the object moving in the horizontal direction and the vector 1530 of the reading speed of the sensor. However, methods of correcting the swing object distorted due to the rolling shutter operation are not limited thereto.

Figure 16:
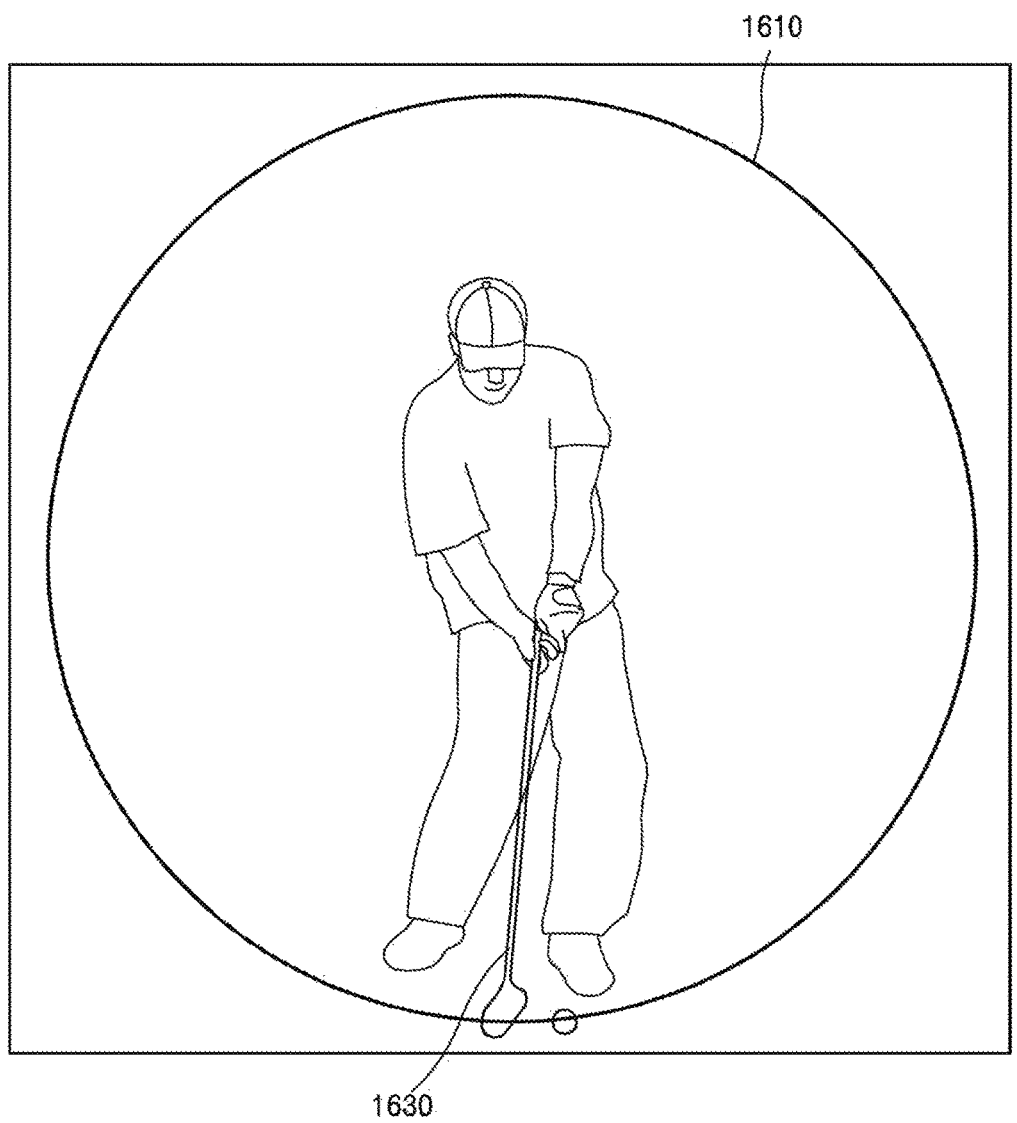
FIG. 16 is a view of an example of a method of displaying a photographed image, according to an embodiment.

FIG. 16 is a view of an example of a method of displaying a photographed image according to an embodiment. The photographing apparatus 701 may additionally store a swing orbit 1610 displayed on a live view as metadata. When the photographing apparatus 701 displays a photographed image on the displayer 710, the photographing apparatus 701 may display the swing orbit 1610 stored as metadata together with the photographed image. The swing orbit 1610 may be provided as a shape of a line 1610 connecting a trace of an end of the swing object, which is far from a user.

In some embodiments, the swing orbit 1610 may be provided as various other shapes connecting the trace of the end of the swing orbit, which is far from the user.

The present disclosure may be embodied as computer-readable codes in a computer-readable recording medium. The computer-readable recording medium may be any recording apparatus capable of storing data that is read by a computer system.

The computer-readable codes are formed to perform operations implemented in an image processing method according to the present disclosure, when the computer-readable codes are read from the computer-readable recording medium by a processor and executed. The computer-readable codes may be realized as various programming languages. Also, functional programs, codes, and code segments for embodying the present disclosure may be easily derived by programmers in the technical field to which the present disclosure pertains.

Examples of the computer-readable recording medium include read-only memories (ROMs), random-access memories (RAMs), CD-ROMs, magnetic tapes, floppy disks, and optical data storage devices. The computer-readable recording medium may be a carrier wave that transmits data via the Internet, for example. The computer readable medium may be distributed among computer systems that are interconnected through a network, and may be stored and implemented as computer readable codes in the distributed system.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of controlling a photographing apparatus photographing a swing movement, the method comprising:
   receiving an input with respect to a region of interest in the swing movement;
   receiving a portion of the swing movement input on an area of a screen, when a live view image is displayed on the screen;
   determining a rotational angle of a swing object based on the received portion of the swing movement, including predicting a swing orbit of the swing object; and
   determining a point in time of photographing the region of interest, based on the determined rotational angle and the predicted swing orbit, and after determining the point in time of photographing then photographing a subject at the determined point in time of photographing.

2. The method of claim 1, wherein the determining of the rotational angle of the swing object comprises generating a swing orbit based on the received portion of the swing movement, and correcting at least one of: distortion of the swing orbit due to an angle between a reference plane of the swing movement and the swing object and distortion of the swing orbit due to an angle between the photographing apparatus and the subject.

3. The method of claim 2, wherein the correcting comprises determining at least one of the angle between the reference plane and the swing object and the angle between the photographing apparatus and the subject, using at least one of a predetermined equation and data obtained by learning.

4. The method of claim 1, wherein the receiving of the input with respect to the region of interest comprises automatically receiving an input with respect to a predetermined region or manually receiving the input.

5. The method of claim 1, wherein the determining of the rotational angle of the swing object comprises when an image sensor obtaining an image operates as a rolling shutter, correcting a reading angle error with respect to an object moving in a horizontal direction of the image sensor.

6. The method of claim 1, wherein the point in time of photographing is determined by determining a gap between a point in time in which a photographing instruction is received and a point in time in which the photographing is performed.

7. The method of claim 1, wherein the photographing the subject comprises photographing all or part of the region of interest as one or more of a still image and a video.

8. The method of claim 1, wherein the photographing the subject comprises photographing all or part of the region of interest by changing frames per second (FPS) or resolution.

9. The method of claim 2, further comprising storing the generated swing orbit as metadata, and when displaying the photographed image, displaying the swing orbit stored as metadata together with the photographed image.

10. A photographing apparatus for photographing a swing movement, the photographing apparatus comprising:
    an input device comprising input circuitry configured to receive an input with respect to a region of interest in the swing movement;
    a displayer comprising a display configured to display a live view image; and
    a processor configured to control the photographing apparatus to determine a rotational angle of a swing object based on a portion of the swing movement displayed on the displayer, including to predict a swing orbit of the swing object, to determine a point in time of photographing the region of interest based on the determined rotational angle and predicted swing orbit, and to photograph a subject at the determined point in time of photographing.

11. The photographing apparatus of claim 10, wherein the processor is configured to generate a swing orbit based on the displayed portion of the swing movement, and to correct at least one of: distortion of the swing orbit due to an angle between a reference plane of the swing movement and the swing object, and distortion of the swing orbit due to an angle between the photographing apparatus and the subject.

12. The photographing apparatus of claim 11, wherein the processor is configured to determine one or more of the angle between the reference plane and the swing object and the angle between the photographing apparatus and the subject, using at least one of a predetermined equation and data obtained by learning, and to correct the one or more of the distortion due to the angle between the reference plane and the swing object and the distortion due to the angle between the photographing apparatus and the subject.

13. The photographing apparatus of claim 11, wherein the input device is configured to automatically receive an input with respect to a predetermined area or to manually receive the input.

14. The photographing apparatus of claim 10, wherein when an image sensor obtaining an image operates as a rolling shutter, the processor is configured to correct a swing orbit by correcting a reading angle error with respect to an object moving in a horizontal direction of the image sensor.

15. The photographing apparatus of claim 10, wherein the processor is configured to determine the point in time of photographing by determining a gap between a point in time in which a photographing instruction is received and a point in time in which the photographing is performed.

16. The photographing apparatus of claim 10, wherein the processor is configured to cause photographing of all or part of the region of interest as one or more of a still image and a video.

17. The photographing apparatus of claim 10, wherein the processor is configured to control the photographing apparatus to photograph all or part of the region of interest by changing frames per second (FPS) or resolution.

18. The photographing apparatus of claim 11, wherein the apparatus is configured to store the generated swing orbit as metadata, and when displaying the photographed image, to display the swing orbit stored as metadata together with the photographed image.

19. A non-transitory computer-readable recording medium having embodied thereon a computer program which, when executed causes the photographing apparatus to perform the operations recited in claim 1.

* * * * *